United States Patent
Ishii et al.

(10) Patent No.: US 7,218,758 B2
(45) Date of Patent: May 15, 2007

(54) DRIVE SUPPORTING DEVICE

(75) Inventors: Hirofumi Ishii, Kawasaki (JP);
Kazufumi Mizusawa, Kawasaki (JP);
Tsuyoshi Okada, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 800 days.

(21) Appl. No.: 10/472,919

(22) PCT Filed: Mar. 1, 2002

(86) PCT No.: PCT/JP02/01933

§ 371 (c)(1),
(2), (4) Date: Sep. 24, 2003

(87) PCT Pub. No.: WO02/080557

PCT Pub. Date: Oct. 10, 2002

(65) Prior Publication Data

US 2004/0105579 A1    Jun. 3, 2004

(30) Foreign Application Priority Data

Mar. 28, 2001 (JP) .............................. 2001-093721
Aug. 10, 2001 (JP) .............................. 2001-224275

(51) Int. Cl.
*G06K 9/00* (2006.01)

(52) U.S. Cl. ...................... 382/104; 340/933; 340/988; 701/1

(58) Field of Classification Search ................ 382/104; 340/435, 932.2, 937, 988; 701/1, 23, 80, 701/82, 202, 209, 210, 211
See application file for complete search history.

(56) References Cited

U.S. PATENT DOCUMENTS 5,742,507 A * 4/1998 Eckert .......................... 701/70
6,122,573 A * 9/2000 Higashi et al. ................ 701/23
6,411,867 B1 * 6/2002 Sakiyama et al. ............. 701/1
6,466,684 B1 * 10/2002 Sasaki et al. ................ 382/104

FOREIGN PATENT DOCUMENTS

| JP | 58-110334 | 6/1983 |
| JP | 7-186833 | 7/1995 |
| JP | 7-306037 | 11/1995 |
| JP | 7-334679 | 12/1995 |
| JP | 8-278126 | 10/1996 |
| WO | WO 00/07373 | 2/2000 |

* cited by examiner

*Primary Examiner*—Samir Ahmed
*Assistant Examiner*—Abolfazl Tabatabai
(74) *Attorney, Agent, or Firm*—Pearne & Gordon LLP

(57) ABSTRACT

The object of the invention is to provide driving support apparatus which allows the driver to intuitively and more accurately recognize the situation around an obstacle thus reducing a burden of the driver. Driving support apparatus according to the invention has a plurality of image pickup means (1001, 3001) mounted on a mobile unit, conversion means (3008) for converting an image picked up by said image pickup means (3001) to an image seen from a virtual viewpoint above said image pickup means (1001, 3001) or an image obtained through orthogonal projection from above based on a road surface model, 3D map creation means (3007) for detecting three-dimensional information on that other than that on the road surface based on the parallax between the images picked up by the plurality of image pickup means, 3D image composition means (3008) for correcting the distortion of a figure in said viewpoint-converted image based on said detected three-dimensional information, and display means (3009) for displaying said distortion-corrected image.

17 Claims, 32 Drawing Sheets

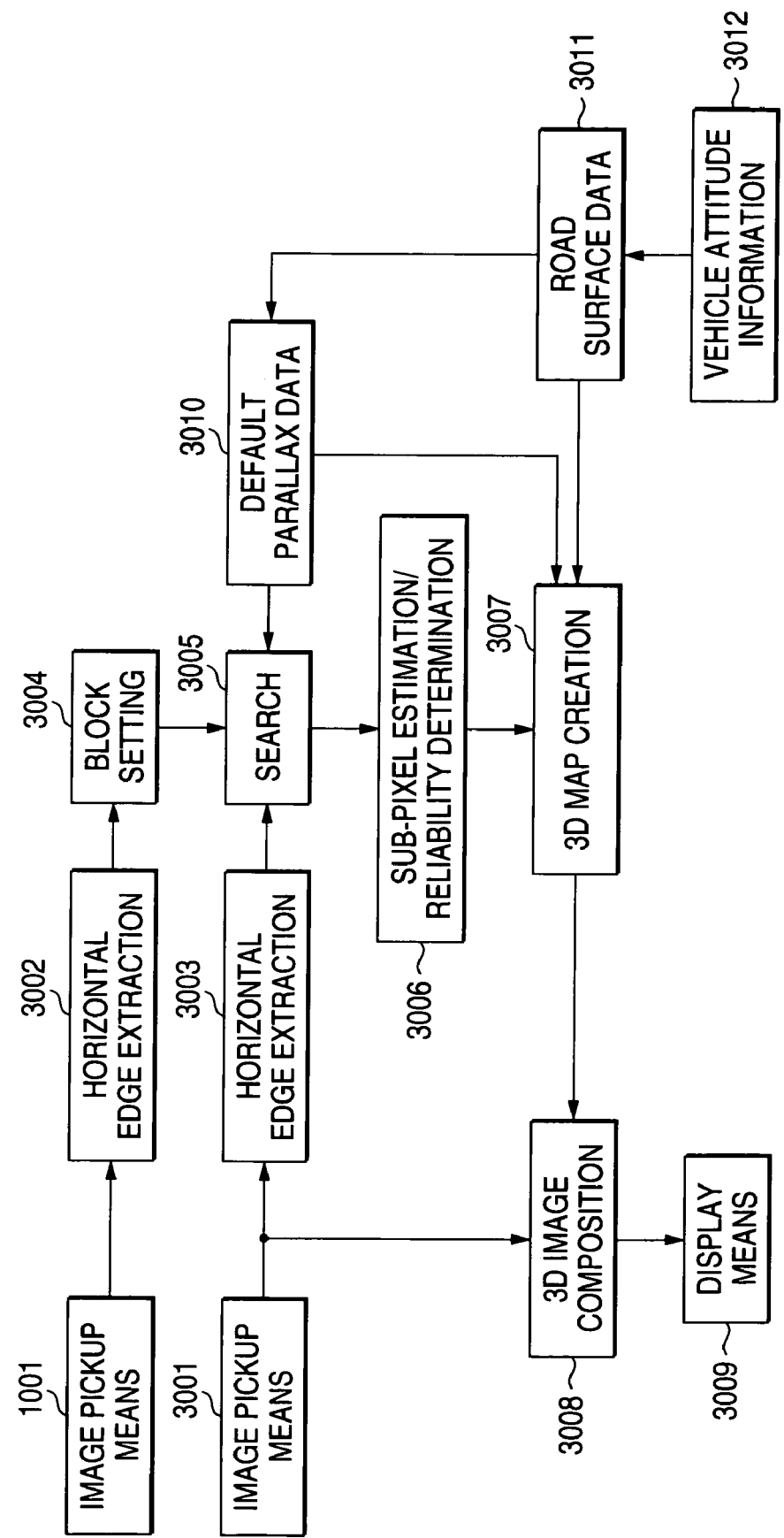

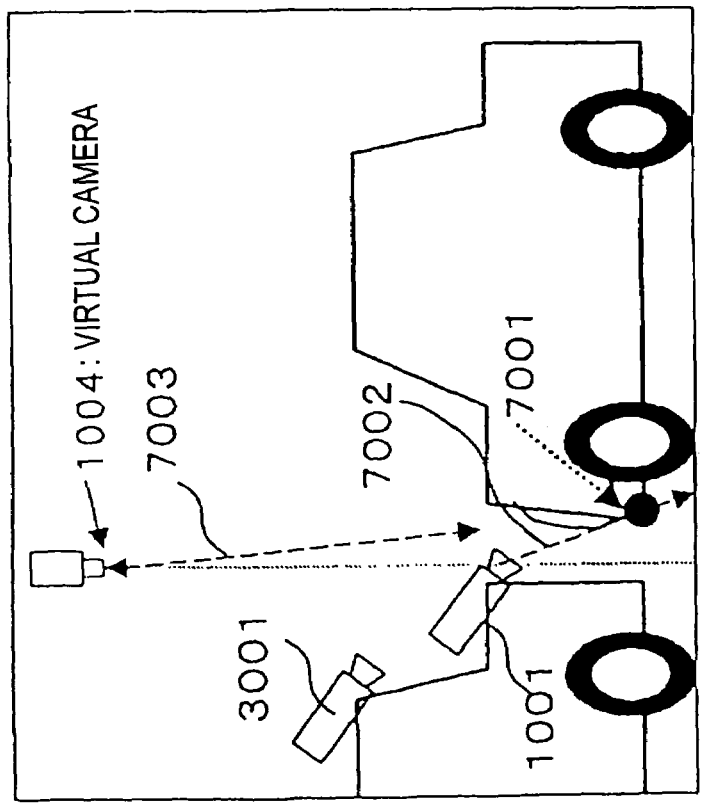
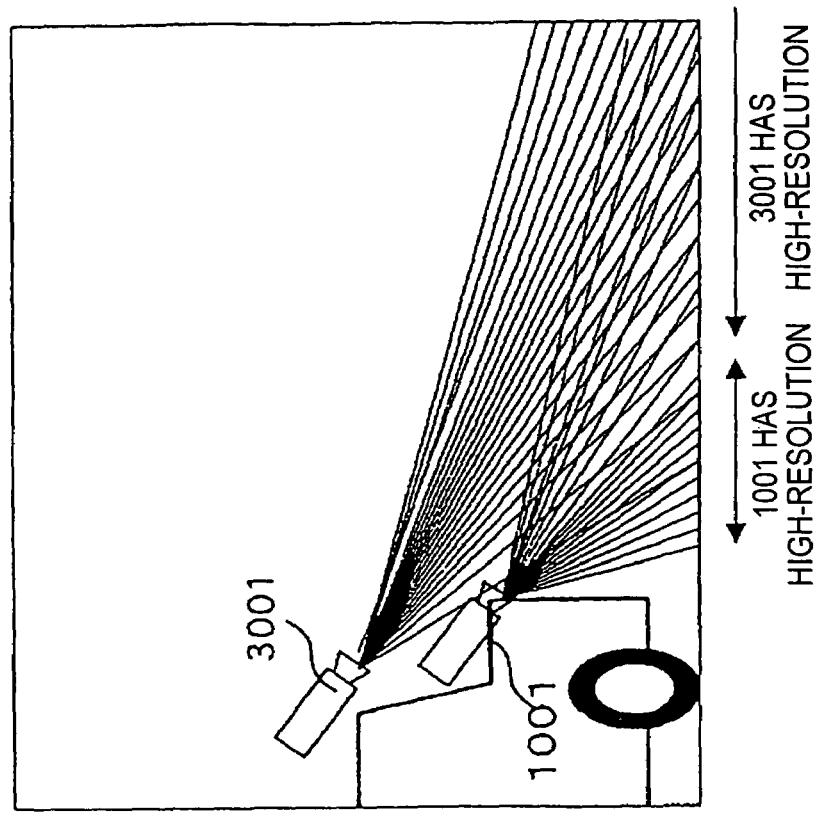

DRIVE SUPPORTING DEVICE

TECHNICAL FIELD

The present invention relates to driving support apparatus for supporting driving a vehicle by picking up the situation around the vehicle by using image pickup means attached to the vehicle and displaying the picked up image in the vehicle and to driving support apparatus for supporting driving a vehicle by compounding an image easy to understand the distance to obstacles around the vehicle on a screen from an image picked up by the image pickup means, and by displaying the resulting image to the driver.

BACKGROUND ART

For related art driving support apparatus which uses image pickup means attached to a vehicle, there is a method to change the viewpoint of a composite image. The method is disclosed for example in JP-A-58-110334. In the case of this related art apparatus, a composite image seen from a new viewpoint, for example from above, is created. In such a case, the distance from a vehicle and another object is proportional to the distance on the screen, so that it is easy to intuitively understand the actual distance. While such driving support apparatus is sometimes called a mobile unit image display system, the term driving support apparatus is used in the specification.

Operation of the related art example will be explained using FIGS. 31A to 31D. FIG. 31A is a schematic view to explain the relation between actual image pickup apparatus and a virtual viewpoint. In the figure, image pickup apparatus 1001 attached to a vehicle picks up the rear of the vehicle, mainly the road surface at a downward angle. Assuming that the direction of pixels 1002 where an image of image pickup apparatus is present picks up a point 1003 on a three-dimensional road surface, it is understood that the position seen from a virtual viewpoint above (virtual camera) 1004 corresponds to pixels in a direction 1005 on the screen of an image of the virtual camera. FIG. 31B shows the situation of a vehicle and a rear camera in an actual parking lot and a periphery of the parking lot. The image pickup apparatus 1001 picks up the image of the range of field 1006 in the parking lot. In this example, in particular the direction of pixels 1002 is directed to a point 1003 in the corner of white lines on the road surface. FIG. 31C is an image actually obtained from the image pickup apparatus 1001. The point 1003 in the corner of white lines on the road surface has its position converted and compounded to correspond to the pixels in the direction 1005 seen from the overhead virtual viewpoint 1004. FIG. 31D is a composite image. In the figure, the point 1003 is positioned on the road surface so that the relative position with respect to the vehicle is accurately reproduced. All the while lines in other parking sections are positioned on a road surface so that the relative position with respect to the vehicle is accurately reproduced on a composite image.

The driver of a vehicle can understand the relation between the vehicle and its surroundings by watching this composite image.

However, the related art technology has a problem. The problem will be described using FIGS. 32A to 32D.

FIG. 32A explains a case where an object positioned elsewhere than on a road surface, such as a bumper of a vehicle is picked up in the example of FIG. 31A. In this case, a point picked up by the image pickup means 1001 in a direction 1002 is a point (bumper of a vehicle) 2001 positioned above the three-dimensional road surface. However, a road surface is assumed in the case that an image is compounded from a virtual viewpoint 1004 so that image composition is made assuming that the point to be picked up is present on a point 2002 as an intersection of the direction 1002 and the road surface.

FIG. 32B shows an actual vehicle, a rear camera, and the point 2001 of a bumper position of a vehicle in the rear. FIG. 32C is an image of the image pickup apparatus 1001. In the image, the point 2001 of the bumper and a point 2002 of the intersection of its direction and the road surface are overlaid on a single point. In the composite image shown in FIG. 32D, the point 2002 is compounded farther than the point 2001. Moreover, other portions of the vehicle in the rear are compounded as if they existed farther than actual position and are distorted to a large extent, except the tires which come in contact with the road surface.

In this way, in the related art, only the ground is assumed for conversion of viewpoint. As a result, what is not on the three-dimensional ground, for example other vehicles and obstacles are distorted in a composite image.

When the related art is utilized as driving support apparatus, the bumper of another vehicle is displayed farther than the actual position. While the user driving a car assumes an ample distance from this image, the distance to the actual obstacle is longer so that the car is more likely to come in contact with the object. Thus, removing the dislocation and image distortion is an important problem in applications.

As a countermeasure against such distortion of a viewpoint-converted image from above, there is disclosed an example in JP-A-7-186833. In this example, a same color is extracted across the image, then a road surface area and a non-road-surface area are separated by the expansion and contraction of the area. For the road surface area, a converted image from above is compounded. For the non-road-surface area, an input image of the area is scaled up/down without performing viewpoint conversion and the resulting image is pasted on the converted image. This allows composition of an image without distortion of obstacles present above the road.

However, this example leaves the problems described in the problems (1) through (3) below.

(1) Separation of a road surface area and non-road-surface area is made using color information, so that separation is inaccurate at a portion where texture changes to a great extent on the road surface and a portion of a similar color to that of a road, such as a building.

(2) An obstacle apart from the ground, such as a bumper is compounded as part of a road. This extends the road area farther than the actual road in the composite image.

(3) While the road surface is converted to an image from a viewpoint above, the obstacle remains an input image. The resulting composite image is unnatural and the driver may have difficulty in intuitively understand the information on the surrounding.

Concerning the problems (1), a technology to separate a road surface and a non-road surface is disclosed in JP-A-7-334679. In this example, images picked up by right and left cameras are associated to coincide at a position where they are projected onto a road surface. Then separation is made: an area where the two corresponding image signals are similar to each other within a threshold is defined as a road surface area and the remaining area as a non-road-surface area.

This example, however, leaves the problems (1) through (3) below.

(1) An obstacle apart from the ground, such as a bumper, is recognized as part of a road farther than the actual road.

(2) Vertical edges are easy to recognize from stereo cameras arranged right and left although portions without edges and horizontal edge portions cannot be recognized. In particular, the boundary with an obstacle apart from the ground such as a bumper tends to appear as a horizontal edge on the screen.

(3) While viewpoint conversion from above is not mentioned in this example, there is no effect of distortion correction on a converted image of an obstacle.

The invention has been proposed in order to solve the problems of the related art driving support apparatus and aims at providing driving support apparatus which allows the driver to intuitively and more accurately recognize the situation around an obstacle thus reducing a burden of the driver.

DISCLOSURE OF THE INVENTION

Driving support apparatus according to the invention has image pickup means mounted on a mobile unit, conversion means for converting one or more images picked up by the image pickup means to an image seen from a virtual viewpoint above the image pickup means or an image orthogonal-projected from above based on a road surface model, detection means for detecting three-dimensional information other than that on the road surface based on a parallax between images picked up by the image pickup means, distortion correction means for correcting distortion of a figure in an image, for which said viewpoint conversion is performed based on the detected three-dimensional information, and display means for displaying an image for which the distortion-corrected is performed. With this configuration, it is possible to detect three-dimensional information other than that on the road surface based on the parallax between the images picked up by image pickup means and correct the distortion of the converted image and display the corrected image.

Driving support apparatus according to the invention has image pickup means mounted on a mobile unit, conversion means for converting one or more images picked up by the image pickup means to an image seen from a virtual viewpoint above a position of the image pickup means or an image orthogonal-projected from above based on a road surface model, and obstacle area detection means for detecting an area where a parallax between images picked up by the image pickup means does not coincide with a parallax on the road surface model as an obstacle area. With this configuration, it is possible to detect the area other than the road surface as an obstacle area by using the parallax between the images picked up by image pickup means and the parallax on a road surface model.

Further, driving support apparatus according to the invention has image pickup means mounted on a mobile unit, conversion means for converting one or more images picked up by the image pickup means to an image seen from a virtual viewpoint above a position of the image pickup means or an image orthogonal-projected from above based on a road surface model, obstacle area detection means for detecting an unmatched area between the converted images as an obstacle area, overlay means for overlaying the obstacle area in the converted image, and display means for displaying the composite image. With this configuration, it is possible to detect an unmatched area between converted images as an obstacle area and overlays signals indicating the obstacle area in the converted image and display the resulting image.

Driving support apparatus according to the invention has image pickup means mounted on a mobile unit, intermediate image conversion means for converting one or more images picked up by the image pickup means to an intermediate image inn which a distance and an angle from the image pickup means are coordinates based on a road surface model, obstacle area detection means for detecting an unmatched area between the converted images, compares two images in the area estimate an actual distance, corrects a distance to and a position of the area in the converted image with the estimated distance, and outputs the corrected area as an obstacle area, overlay means for overlaying the obstacle area in the converted image, conversion means for converting the composite image to an ordinary coordinate image of a road surface, and display means for displaying the converted image. With this configuration, it is possible to estimate the actual distance of an unmatched area between intermediate images using the distance and angle from image pickup means as coordinates and correct the position of the area, detect the corrected area as an obstacle area, compound signals indicating the obstacle area, convert the composite image to an ordinary coordinate image, and display the resulting image.

Driving support apparatus according to the invention has image pickup means mounted on a mobile unit, conversion means for respectively converting one or more images picked up by the image pickup means to an image seen from a virtual viewpoint above a position of the image pickup means or an image orthogonal-projected from above based on a road surface model, and display means for displaying the converted image, wherein the conversion means determines a strength based on a size of each pixel on the road surface model on the screen of the image pickup means and an angle to the road surface, and varies a brightness and a color of pixels based on the strength. With this configuration, it is possible to vary the brightness and color of the pixel based on the size of each pixel on a road surface model in the screen of the image pickup means and its angle to the road surface.

Driving support apparatus according to the invention has image pickup means mounted on a mobile unit, intermediate image conversion means for converting one or more images picked up by the image pickup means to an intermediate image in which a distance or a height and an angle from the image pickup means are coordinates based on a road surface model and a cylinder model, obstacle area detection means for detecting an unmatched area between the converted images, compares two images in the area to estimate an actual distance, corrects a distance to and a position of the area in the converted image with the estimated distance, and outputs the corrected area as an obstacle area, overlay means for overlaying the obstacle area in the converted image, conversion means for converting the composite image to an ordinary coordinate image of a road surface, and display means for displaying the converted image. With this configuration, it is possible to estimate the actual: distance of an unmatched area between intermediate images using the distance and angle from image pickup means as coordinates and correct the position of the area, detect the corrected area as an obstacle area, compound signals indicating the obstacle area, convert the composite image to an ordinary coordinate image, and display the resulting image.

Driving support apparatus according to the invention has image pickup means mounted on a mobile unit, intermediate image conversion means for converting an image picked up by the image pickup means to an intermediate image in which a plane symmetrical with respect to a straight line linking between the image pickup means as a axis is a projection plane, obstacle area detection means for detecting an unmatched area between the converted images, compares two images in the area to estimate an actual distance, corrects a distance to and a position of the area in the converted image with the estimated distance, and outputs the corrected area as an obstacle area, overlay means for overlaying the obstacle area in the converted image, conversion means for converting the composite image to an ordinary coordinate image of a road surface, and display means for displaying the converted image. With this configuration, it is possible to estimate the actual distance of an unmatched area in an intermediate image which uses a plane symmetrical about a straight line connecting the image pickup means as a projection plane and correct the position of the area, detect the corrected area as an obstacle area, compound signals which indicate the obstacle area in an intermediate image, convert the composite image to an ordinary coordinate image, and display the resulting image.

Driving support apparatus according to the invention has image pickup means mounted on a mobile unit, conversion means for converting an image picked up by the image pickup means to a viewpoint-converted image seen from a virtual viewpoint which is different from a position of the image pickup means, and display means for displaying an image converted by the conversion means, wherein the image pickup means picks up a plurality of images having a predetermined parallax and the display means displays an image which is corrected based on the parallax. With this configuration, it is possible to correct and display the viewpoint-converted image based on the parallax between a plurality of pickup images.

BRIEF DESCRIPTION OF THE DRAWINGS

FIG. 1 is a block diagram showing the configuration of driving support apparatus according to the first embodiment of the invention;

FIGS. 11A and 11B are schematic views explaining the operation of driving support apparatus according to the second embodiment of the invention;

FIG. 1A is a block diagram showing the configuration of a variation of driving support apparatus according to the third embodiment of the invention;

Figure 2A:
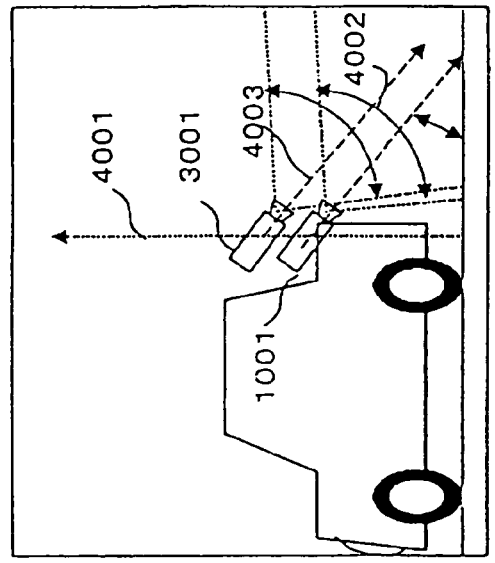
FIGS. 2A to 2D are schematic views explaining the operation of driving support apparatus according to the first embodiment of the invention.

In the figures, a numeral 1001 represents image pickup means, 3001 represents image pickup means, 3002 represents horizontal edge extraction means, 3003 represents horizontal edge extraction means, 3004 represents block setting means, 3005 represents search means, 3006 represents sub-pixel estimation/reliability determination means, 3007 represents 3D map creation means, 3008 represents 3D image composition means, 3009 represents display means, 3010 represents default parallax data means, 3011 represents road surface data means, 3012 represents vehicle attitude information means, 3013 represents image projection means, 3014 represents obstacle edge distance means, 3015 represents obstacle area means, 3016 represents overlay means, 7013 represents image projection means, 8001 represents image projection means, 8002 represents image projection means, 8003 represents obstacle area detection means, 8004 represents overlay means, 8005 represents lens distortion correction/distance/direction image means, 8006 represents lens distortion correction/distance/direction image means, 8007 represents edge comparison means, 8008 represents distance estimation means, 8009 represents obstacle area means, 8010 represents distance/direction/road surface conversion means, 10001 represents image projection means, 10002 represents strength calculation means, 10005 represents strength calculation means, 10006 represents image projection means, 10007 represents image pickup means, 13004 represents overlay means, 13004 represents overlay means, 13005 represents lens distortion correction/distance-height/direction image means, 13006 represents lens distortion correction/distance-height/direction image means, 13007 represents edge extraction means, 13008 represents horizontal block matching/distance estimation means, 13009 represents obstacle boundary means, and 13012 represents search range data means.

BEST MODE FOR CARRYING OUT THE INVENTION

Embodiments of the invention will be described referring to drawings.

First Embodiment

Driving support apparatus according to first embodiment of the invention allows the driver of a vehicle to intuitively and accurately recognize the positions of obstacles around the vehicle and the surrounding situation by converting an image picked up by the image pickup means to an image seen from a virtual viewpoint above, detecting three-dimensional information other than that on a road surface based on the parallax between images picked up by a plurality of image pickup means, correcting the distortion of the converted image based on the three-dimensional information, and displaying the corrected image.

FIG. 1 is a block diagram of driving support apparatus according to the first embodiment of the invention. FIGS. 2 through 6 are schematic views explaining the operation of the driving support apparatus.

As shown in FIG. 1, driving support apparatus according to the first embodiment of the invention has two image pickup means 1001, 3001, a horizontal edge extraction means 3002, 3003 for extracting the horizontal edge of an image picked up by the image pickup apparatus 1001, 3001 respectively, block setting means 3004 for setting blocks for parallax search by using the output of the horizontal edge extraction means 3002, search means 3005 for making block search based on the output of the horizontal edge extraction means 3003, output of the block setting means 3004 and default parallax data 3010 mentioned later, sub-pixel estimation/reliability determination means 3006 for outputting the parallax and reliability determination result of sub-pixel accuracy from the output of the search means 3005, 3D map creation means 3007 for creating a 3D map on the screen of an image from the image pickup means 3001 based on the output of the sub-pixel estimation/reliability determination means 3006, default parallax data 3010 and road surface data 3011 mentioned later, 3D image composition means 3008 for compounding an image seen from a virtual viewpoint above based on an image from the image pickup means 3001 and its 3D map on the screen, and display means 3009 for displaying the output of the 3D image composition means 3008.

Further, driving support apparatus according to the first embodiment of the invention has default parallax data means 301, road surface data means 3011, and vehicle attitude information means 3012.

Two image pickup means 1001 and 3001 are arranged in positions shown in FIG. 2A. In this example, the means are arranged in positions 10 cm apart on a straight line 4001 in the direction perpendicular to the ground. The height of each means from the ground is 100 cm and 110 cm. Respective direction of view is 40 degrees downward with respect to the horizon. Directions of lines of sight 4003 of the two image pickup means are parallel with each other. The range of field 4001 of each image pickup means is 90 degrees in the vertical direction (direction of elevation angle).

Figure 2B:
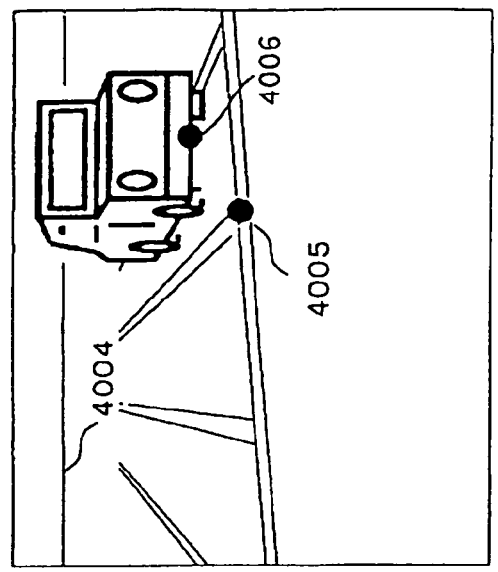
Figure 2C:
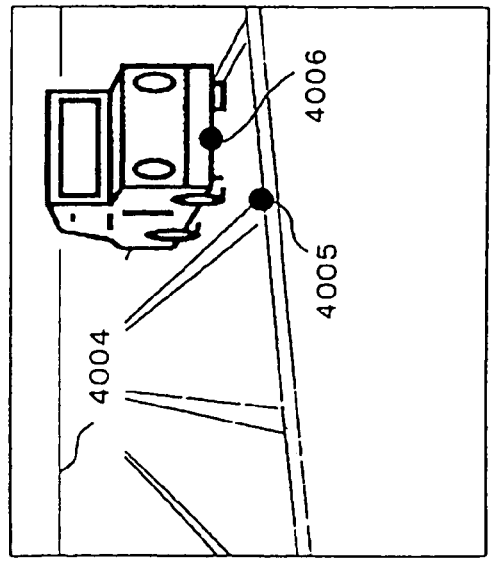
Figure 2D:
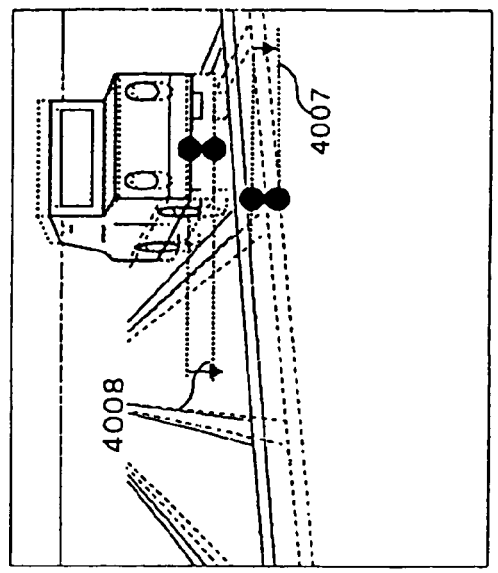

Input image from the two image pickup means 1001, 3001 are images whose positions are virtually constant in the horizontal direction but varied in the vertical direction as show in FIGS. 2B, 2C respectively. The image pickup means 3001 is arranged in a higher position than the image pickup means 1001. Thus, the position of a horizon at infinite-point 4004 is the same on the screen but a closer point (for example a point 4005 on a white line on a road surface or a point 4006 on the bumper of a vehicle) is positioned lower than the image in FIG. 2B. Variation in the vertical position results in a vertical parallax 4007 or 4008 as shown in FIG. 2B where two images are overlaid. In this example, a numeral 4007 represents the parallax of a white line on a road surface while a numeral 4008 the parallax of the bumper of a vehicle above the road surface.

Horizontal edge extraction means 3002, 3003 shown in FIG. 1 extract a vertical edge of the two pickup images by using the operation in the following expression [1], where L represents a luminance signal of an image, x represents a horizontal pixel position and y represents a vertical pixel position.

$$L'(x,y)=2*L(x,y)-L(x,y-1)-L(x,y+1) \qquad \text{Expression [1]}$$

Via this operation, for example in the image of FIG. 2B, the edges (4009, 4010) of the bumper and white line close to each other horizontally on the ground are emphasized. Edges (4011, 4012) closer to each other vertically are weakened.

Figure 3B:
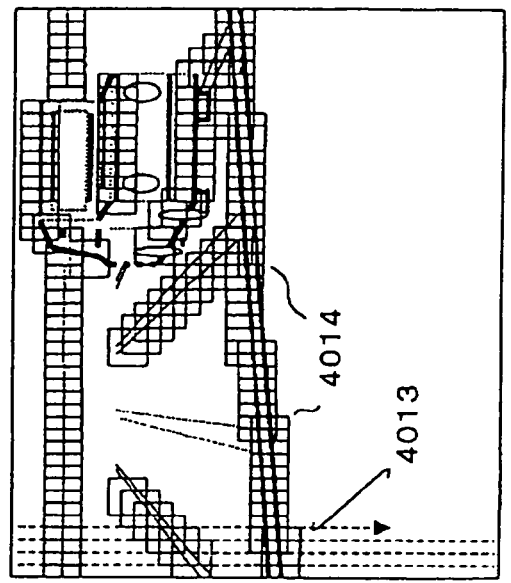
FIGS. 3A to 3D are schematic views explaining the operation of driving support apparatus according to the first embodiment of the invention.

The block setting means 3004 in FIG. 1 performs block setting for parallax search on an image where horizontal edge is emphasized by the horizontal edge extraction means 3002, 3003. FIG. 3B explains the block setting. The maximum point and the minimum point of L'(x,y) shown in Expression [1] are obtained in accordance with scan lines 4013 running in vertical direction every two pixels. Blocks 4014 of five vertical pixels by five horizontal pixels about those points are set. As shown in FIG. 3B, a plurality of these blocks are arranged overlapping one another on the horizontal edge on the screen.

Figure 3D:
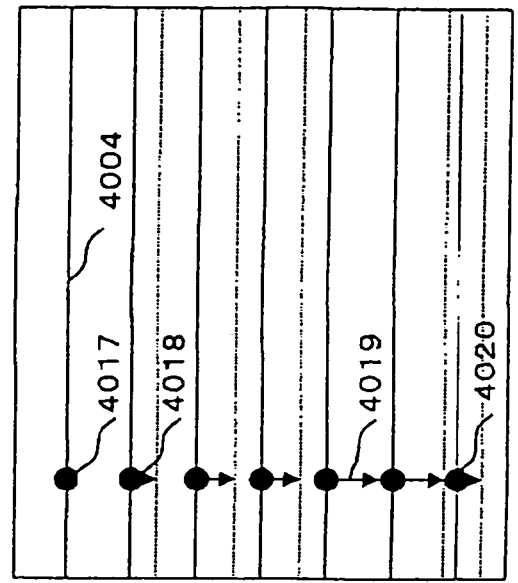
Figure 3A:
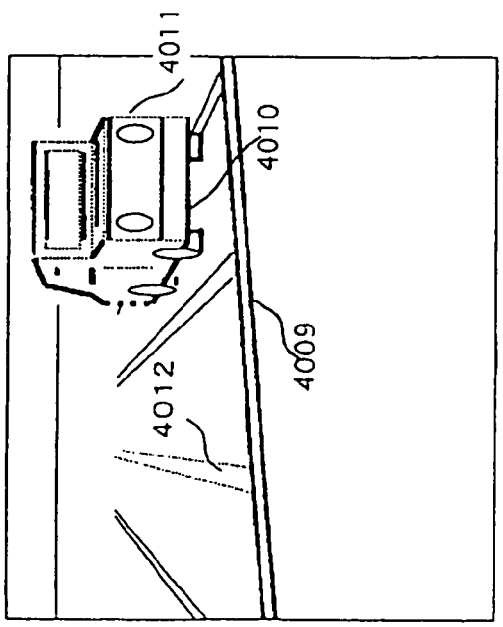
Figure 3C:
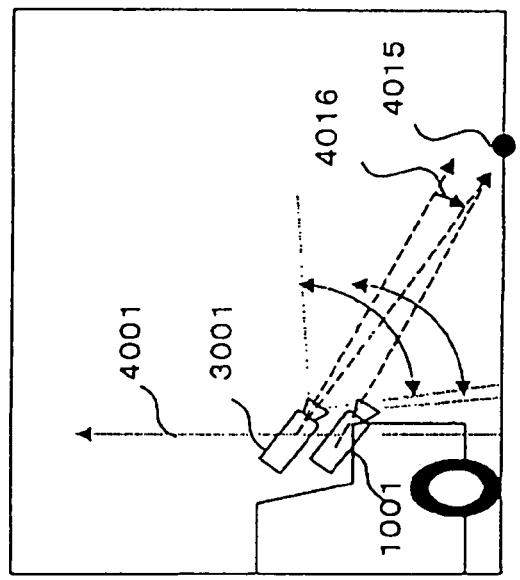

Default parallax data 3010 which is based on the road surface data 3011 in FIG. 1 will be described. This is a value of parallax calculated in advance assuming that both of the two image pickup means 1001, 3001 pick up the road surface, as shown in FIG. 3C. In FIG. 3C, the parallax of a point 4015 on the road surface is calculated as an angle 4016. FIG. 3D shows the default parallax data on the screen. While the default parallax 4017 of the position of a horizon at an infinite-point 4004 is 0, default parallax becomes larger as shown by 4018, 4019 as the point comes closer (becomes lower on the screen). The point comes yet closer until the direction-of line of sight of the image pickup means 1001, 3001 approaches the vertical direction. This reduces the default parallax as shown by a numeral 4020.

An object positioned above a road surface generates a larger parallax than the default parallax. Thus, search means 3005 in FIG. 1 makes a search in the direction of a larger parallax while using the default parallax as an initial value of the search.

The upper limit of the search parallax is determined as follows: As shown in FIG. 4A, a parallax is approximated assuming a wall 4021 which is 50 cm away from a vehicle and perpendicular to the ground and a wall 4022 having an angle of 60 degrees to just below the image pickup means 1001, 3001. The value of the parallax 4023 on the screen is assumed as an upper limit of search parallax.

Search means 3005 searches for a parallax DY where a correlation value F shown in Expression [2] below is the maximum with respect to an image signal L3' from the image pickup means 3001, concerning a five-by-five pixel signal L'(x+j, y+i) set by the block setting means 3004, between the initial value and the upper limit of the search.

$$F=\Sigma i \Sigma j L'(x+j,y+i)*L3'(x+j,y+i+DY) \qquad \text{Expression [2]}$$

:(i=−2 to 2, j=−2 to 2)

Sub-pixel estimation/reliability determination means 3006 analyzes the parallax DY and the correlation value obtained by the search means 3005.

The sub-pixel estimation/reliability determination means 3006 determines that the ratio F/S of the correlation value F and the auto-correlation value S of the block signal L'(x+j, y+i) obtained using $$S=\Sigma i \Sigma j L'(x+j,y+i)*L'(x+j,y+i) \qquad \text{Expression [3]}$$

:(i=−2 to 2, j=−2 to 2)

is reliable when the threshold is 0.75 or more and that the ratio F/S is not reliable when the threshold is less than 0.75.

Figure 4B:
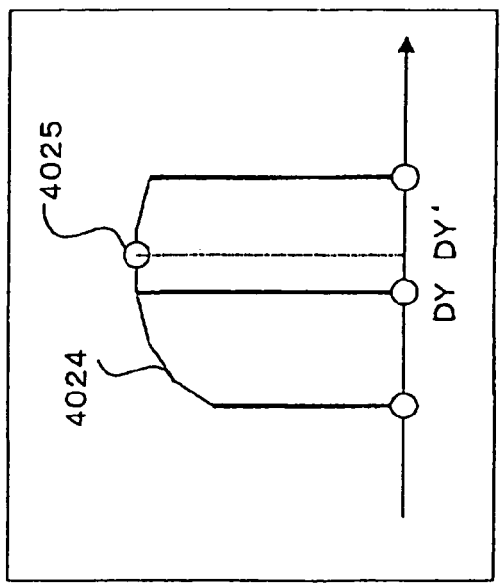
FIGS. 4A to 4D are schematic views explaining the operation of driving support apparatus according to the first embodiment of the invention.

For a block determined as reliable, the sub-pixel estimation/reliability determination means 3006, as shown in FIG. 4B, uses the correlation value F around the pixel-based parallax DY to obtain the maximum point 4025 of a curve 4024 interpolated using a second-order expression and assumes the position as the parallax DY' of sub-pixel accuracy.

The sub-pixel estimation/reliability determination means 3006 outputs the parallax DY' of sub-pixel accuracy and the reliability determination result for each block.

3D map creation means 3007 creates a 3D map on the screen of an image from the image pickup means 3001 based on the parallax DY' of sub-pixel accuracy and the reliability determination result for each block as an output from the sub-pixel estimation/reliability determination means 3006, road surface data 3011, and default parallax data 3010.

Figure 4D:
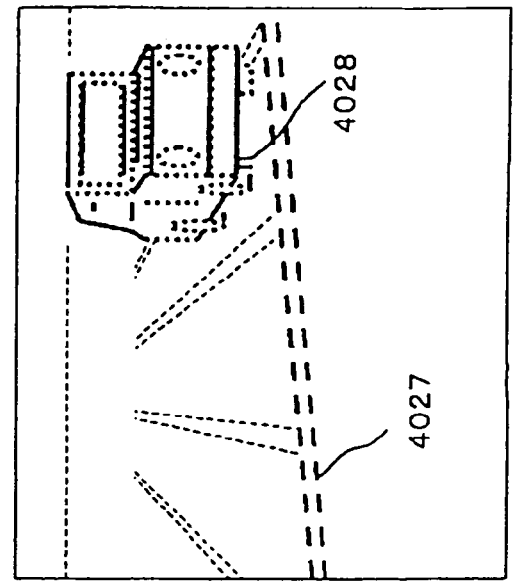
Figure 4A:
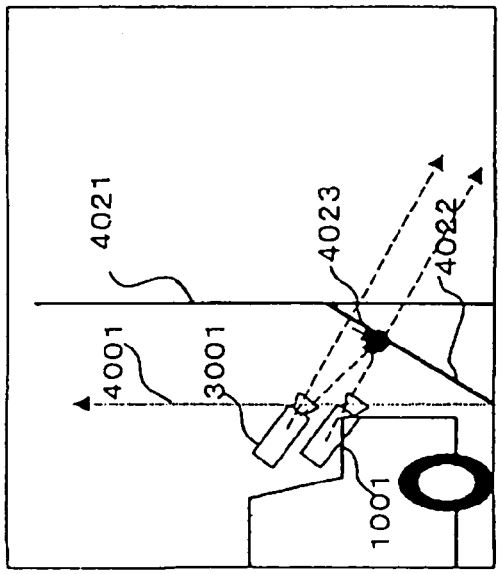
Figure 4C:
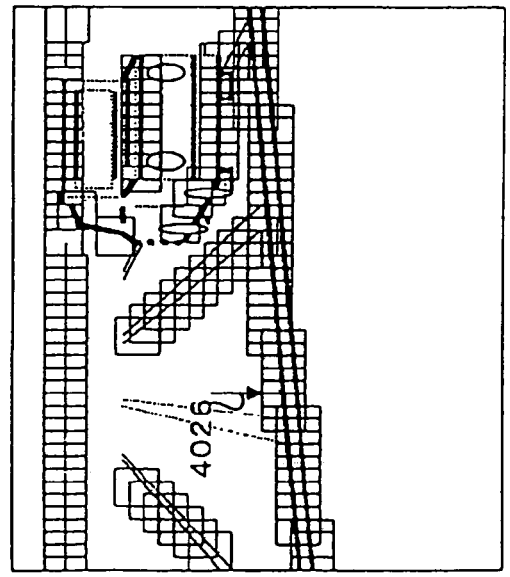

As shown in FIG. 4C, there exists a horizontal edge of an image from the image pickup means 3001 in the position 4026 where each block determined as reliable is moved by the parallax DY'. In this practice, as shown in FIG. 4D, it is determined that a horizontal edge 4027 where the detected parallax DY' coincides with the default parallax data 3010 exists on a road surface and that an unmatched horizontal edge 4028 exists above the road surface. The edge determined to exist above the road surface has its distance from the image pickup means 3001 by way of the value of the detected parallax DY'.

Figure 5B:
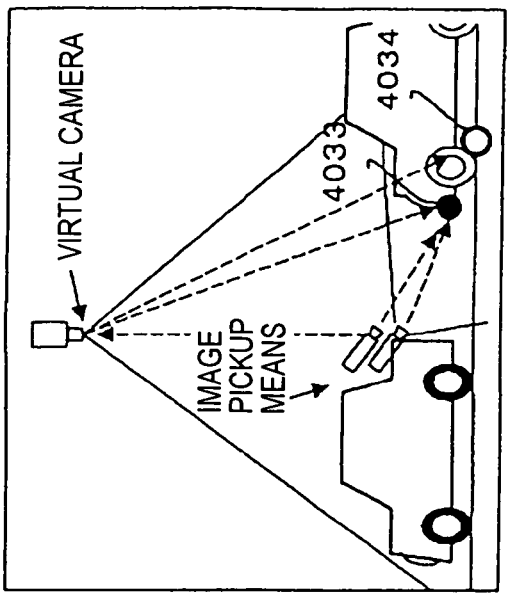
FIGS. 5A to 5D are schematic views explaining the operation of driving support apparatus according to the first embodiment of the invention.
Figure 5D:
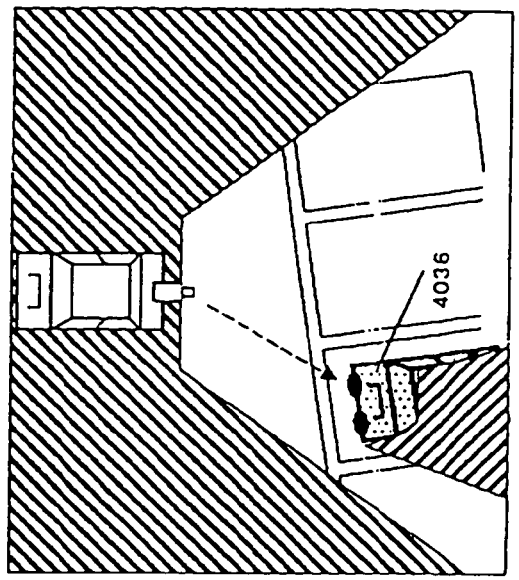
Figure 5A:
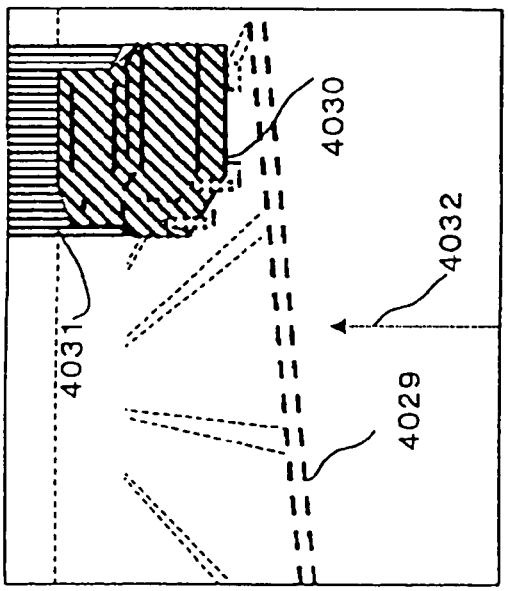

Based on the determination and obtained distance, a 3D map is created for the entire screen as shown in FIG. 5A. As shown by a scan line 4032, the screen is scanned vertically from the bottom. In the case it is determined that a specific area does not have a horizontal edge such as an area 4029 or exists over the road surface although it has a horizontal edge, it is determined that the area exists on the road surface and 3D distance is given to the area based on the value of road surface data 3011. Meanwhile, in an area 4030 between edges determined to exist above the road surface, a value obtained through linear interpolation of the distance between the two edge is given. In an area above the edge determined to exist above the road surface, the distance data of the edge is given.

Figure 5C:
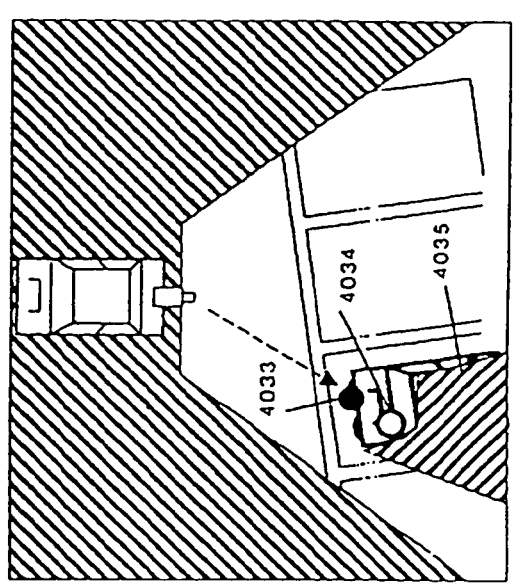

3D image composition means 3008 compounds an image from a viewpoint above based on an image from the image pickup means 3001 and the 3D map of the image on the screen. Thus, as shown in FIG. 5B, even at a point 4033 above the road surface such as a bumper, the position on the screen seen from a virtual viewpoint can be determined based on an accurate 3D position, not the position 4034 on the road surface. Thus, as shown in FIG. 5C, an image is compounded in the accurate position 4033, not the position 4034 on the road surface. On the other hand, a portion behind a vehicle is displayed by hatch lines as shown by an area 4035.

As shown in an area 4036 of FIG. 5D, it is possible to emphasize an area above a road surface by using a red translucent film or blinking.

The composite image is displayed on the display means 3009 and the driver can grasp the position of an obstacle around the vehicle intuitively and accurately.

Figure 6:
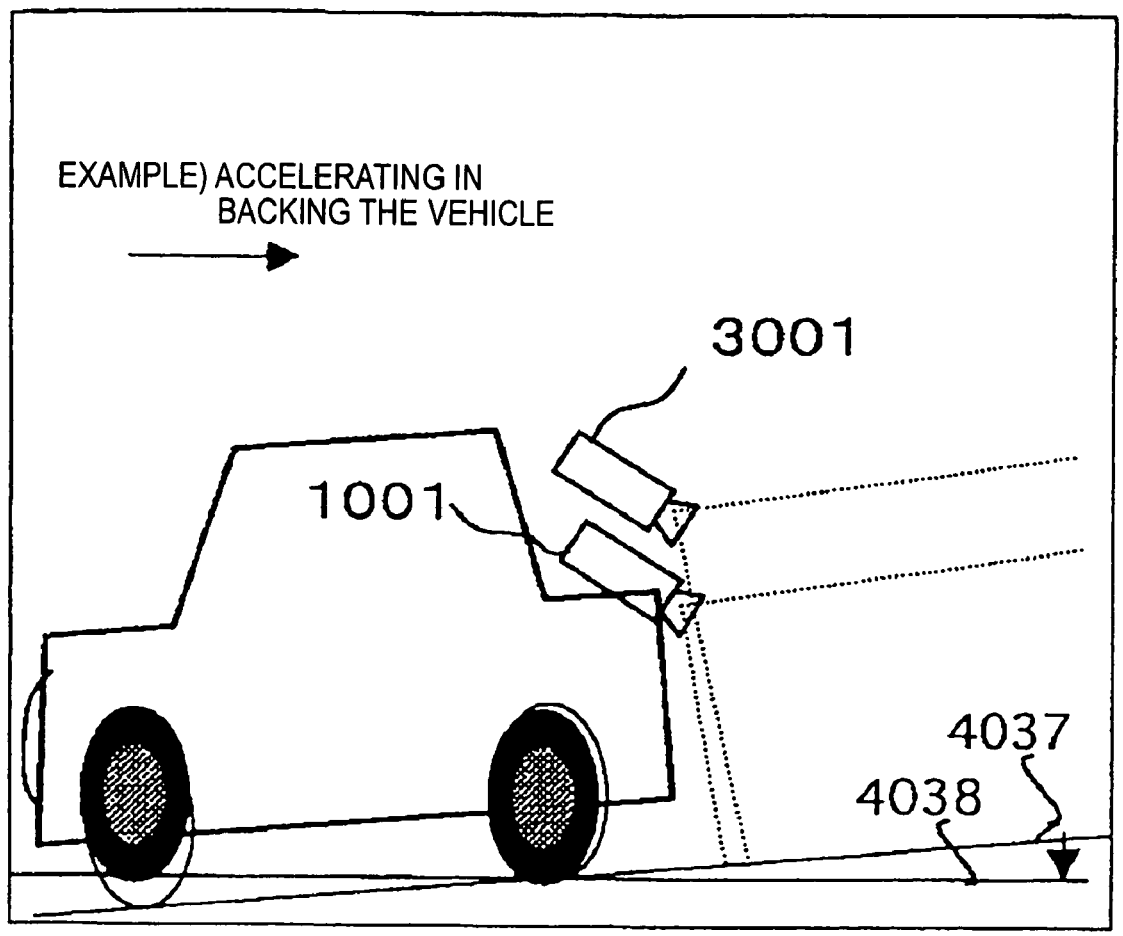
FIG. 6 is a schematic view explaining the operation of driving support apparatus according to the first embodiment of the invention.

Vehicle attitude information means 3012 shown in FIG. 1 outputs information on variation of attitude observed when a vehicle is loaded with baggage or accelerated. The road surface data means 3011, as shown in FIG. 6, calculates varied road surface position data 4038 from ordinary road surface position data 4037 for the image pickup means 1001, 3001 in response to this information. The varied road surface is reflected in the subsequent processing by the default parallax data means or 3D map creation means 3007. As a result, an accurate image is compounded even in the case a vehicle is loaded with baggage or the attitude of the vehicle is varied by acceleration of the vehicle. The driver of the vehicle can understand the position of an obstacle around the car intuitively and accurately at any time by watching this image.

In the first embodiment, distortion on a composite image of an obstacle can be corrected with the parallax between the two image pickup means 1001, 3001 by arranging the image pickup means 1001, 3001 with a vertical spacing of 10 cm in between. This has an advantage that the direction of an obstacle is little affected by any trace of error in the parallax because the spacing between the two image pickup means 1001, 3001 is in the vertical direction, although the distance to the obstacle is somewhat influenced by the error. This is very important when driving a vehicle.

By arranging the image pickup means 1001, 3001 with a vertical spacing of 10 cm in between, it is possible to limit the subsequent parallax detection processing to the edge portion detected by the horizontal edge detection means, thus dramatically reducing the processing volume. A portion of a vehicle above a road surface such as a bumper of a vehicle has a horizontal edge on the screen so that the limited processing on that portion can detect any obstacle without failure.

In this way, according to the first embodiment of the invention, the distance to and direction of an obstacle area represented more intelligibly and accurately by converting an image picked up by the image pickup means mounted on a mobile unit to an image seen from a virtual viewpoint above the image pickup means, detecting three-dimensional information on that other than that on the road surface based on the parallax between the images picked up by a plurality of image pickup means, correcting the distortion of the converted image based on the detected three-dimensional information, and displaying the corrected image. Thus, the driver of the vehicle can check the positions of obstacles around the vehicle and the surrounding situation by watching the displayed image.

Second Embodiment

Driving support apparatus according to second embodiment of the invention allows the driver of a vehicle to intuitively and accurately recognize the positions of obstacles around the vehicle and the surrounding situation by converting an image picked up by the image pickup means mounted on a mobile unit, converting an image picked up by the image pickup means to an image to an image obtained through orthogonal projection from above, detecting the area other than the road surface as an obstacle area by using the parallax between the images picked up by a plurality of image pickup means and the parallax on a road surface model, compounding signals indicating the obstacle area to the converted image signals, and displaying the resulting image.

Figure 7:
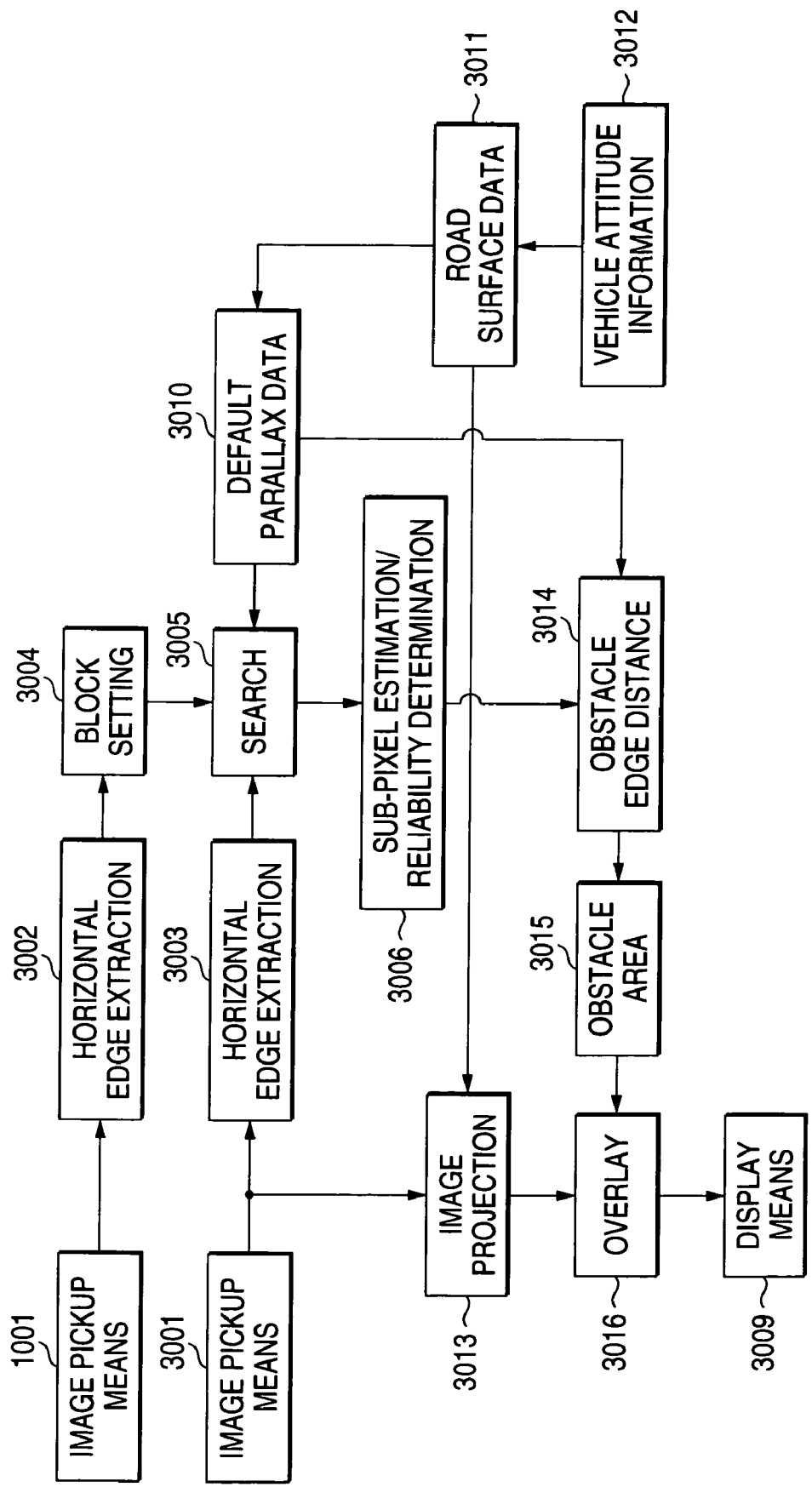
FIG. 7 is a block diagram showing the configuration of driving support apparatus according to the second embodiment of the invention.
Figure 12:
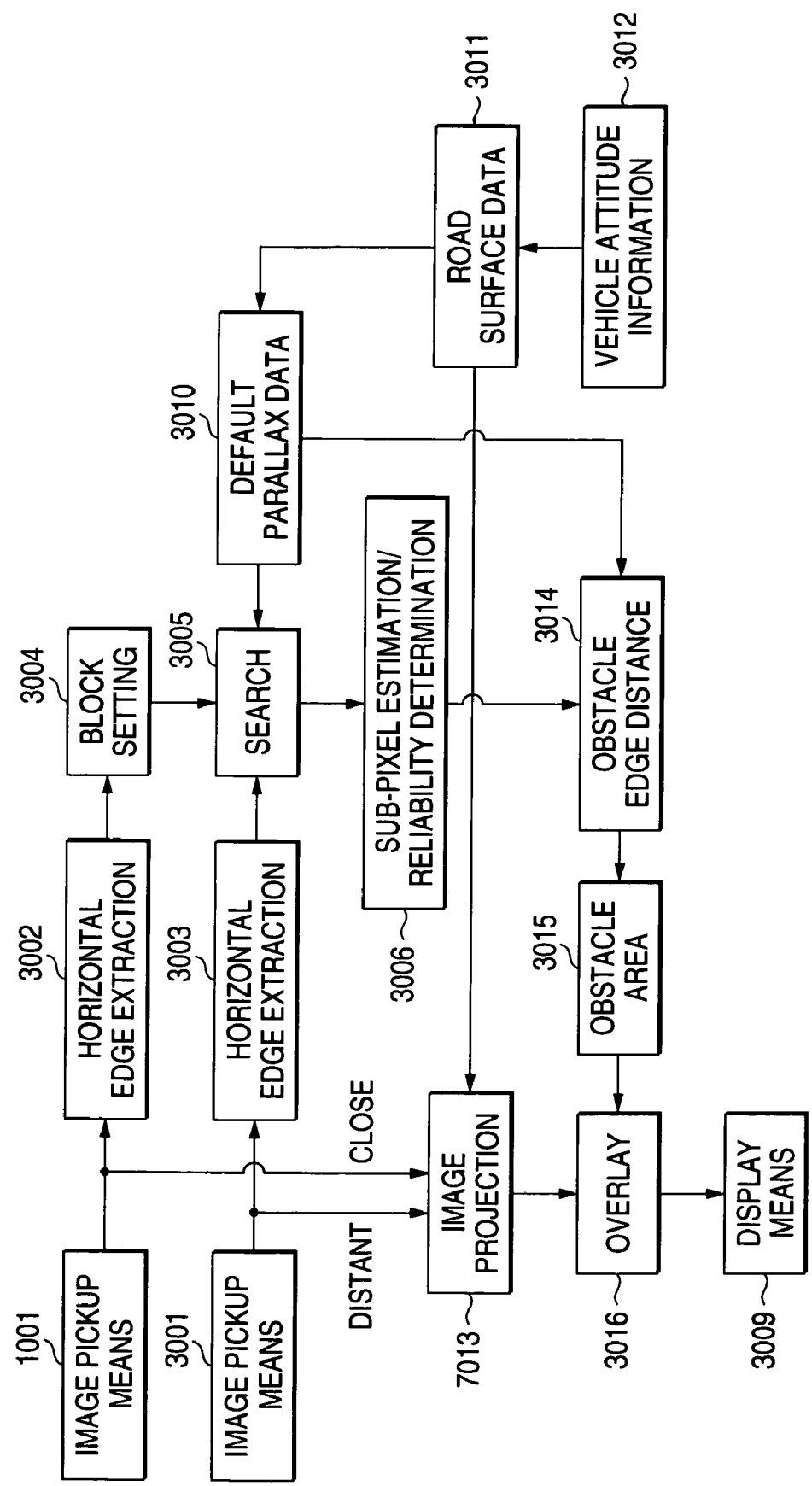
FIG. 12 is a block diagram showing the configuration of a variation of driving support apparatus according to the second embodiment of the invention.

FIG. 7 is a block diagram of driving support apparatus according to the second embodiment of the invention. FIGS. 8 through 11 are schematic views explaining the operation of driving support apparatus according to the second embodiment of the invention. FIG. 12 is a block diagram showing the configuration of a variation of driving support apparatus according to the second embodiment of the invention. Block elements given the same numerals as those in FIG. 1 in the block diagrams FIGS. 7 and 12 have the same configurations and features as those in FIG. 1.

Driving support apparatus according to the second embodiment of the invention has image projection means 3013, obstacle edge distance means 3014, obstacle area means 3015, and overlay means 3016. The driving support apparatus differs from the driving support apparatus according to the first embodiment in that the former does not have 3D map creation means and 3D image composition means.

Figure 8A:
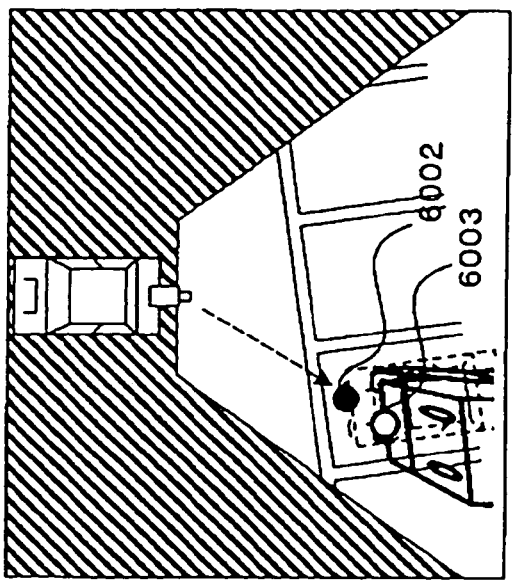
FIGS. 8A to 8D are schematic views explaining the operation of driving support apparatus according to the second embodiment of the invention.

Image projection means 3013, unlike the 3D image composition means 3008 in FIG. 1, compounds an input image from the image pickup means 3001 as the image exits in a position where the image is projected onto a road surface as shown in FIG. 8A, based on the data of the road surface data means 3011. The viewpoint employed is not a virtual one in the first embodiment. An image obtained through orthogonal projection from just above is compounded as shown by the viewpoint 6001 in FIG. 8A. The resulting composite image obtained is distorted such as a bumper point 6002 of a vehicle above a road surface exists at a farther point 6003 in the image, as shown in FIG. 8B in common with the related art.

Figure 8B:
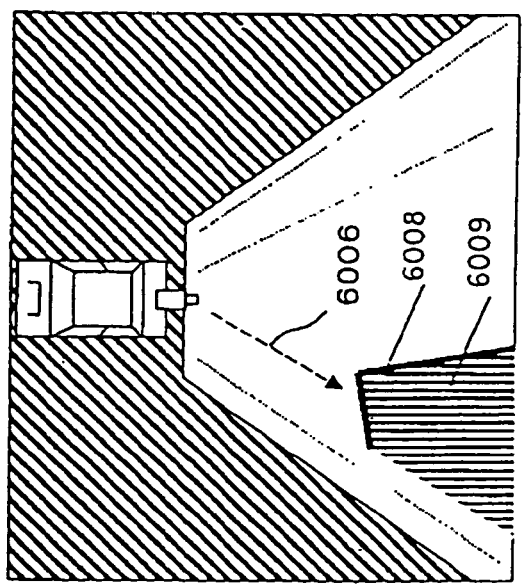
Figure 8C:
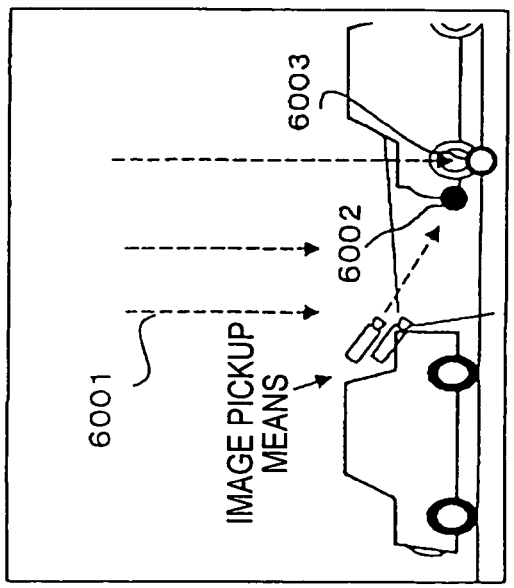

Obstacle edge distance means 3014, similar to the 3D map creation means according to the first embodiment, detects an edge which exists above a road surface as an obstacle edge based on the parallax between the horizontal edges of the two images shown in FIG. 8C obtained by the sub-pixel estimation/reliability determination means 3006, thereby calculating the distance from the image pickup means 3001. As shown by a scan line 6006 of FIG. 8C, the screen is scanned in vertical direction from the bottom and in the case an obstacle line exists on the vertical line, the minimum value of the distance of the obstacle line is stored and output per vertical line.

Figure 8D:
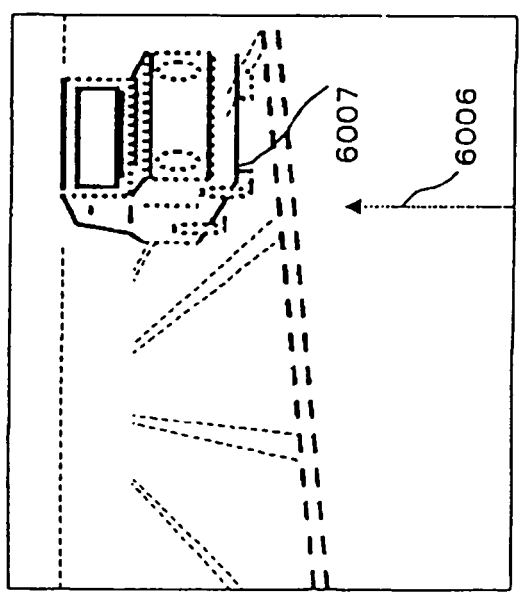

Obstacle area means 3015, as shown in FIG. 8D, compounds a position 6008 where the minimum value of the distance of an obstacle line per vertical line of the output from the obstacle edge distance means 3014 is projected onto a road surface, and a farther area 6009 as an obstacle area.

Figure 9B:
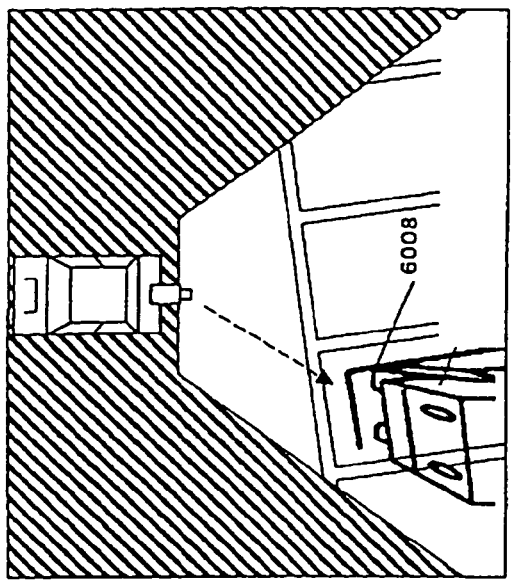
FIGS. 9A to 9D are schematic views explaining the operation of driving support apparatus according to the second embodiment of the invention.
Figure 9D:
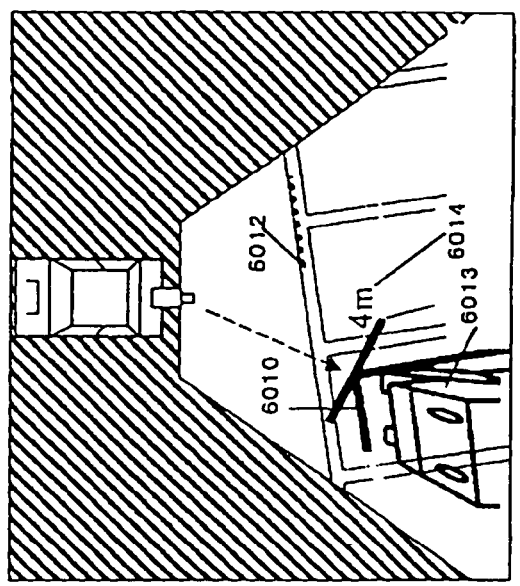
Figure 9A:
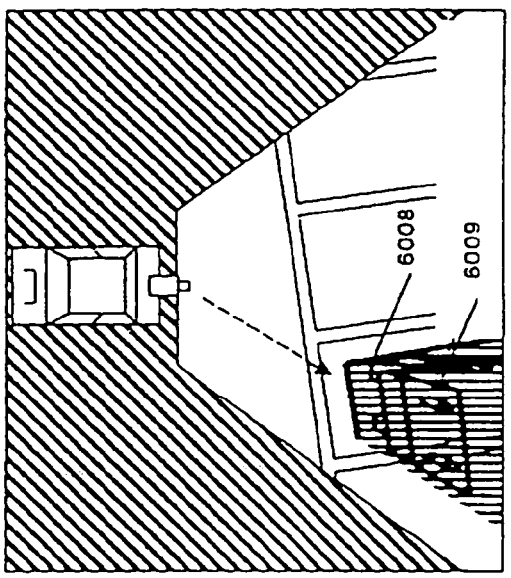

Overlay means 3016 writes an instruction on a layer other than the composite image and overlays the composite images in FIG. 8B and FIG. 8D to form a new composite image, as shown in FIG. 9A. The obstacle area 6009 is compounded as a red translucent film in the image into an area where the vehicle exists in FIG. 8B.

Output of the overlay means 3016 is displayed on the display means 3009. The driver accurately understands the position of white lines on the road surface and the distance to and direction of an obstacle such as another vehicle from the vehicle by watching this image. This allows the driver to drive the vehicle with dramatically greater safety and accuracy than in related art examples.

In the second embodiment, unlike the first embodiment, an input image need not be compounded to a 3D map which varies in real time but need to undergo projection conversion to a predetermined road surface model, thus implementation in an operating circuit is made easy.

The obstacle edge distance means 3014 and the obstacle area means 3015 analyze only the minimum value of the obstacle line per vertical line, unlike the 3D map creation means 3007. This is advantageous in that the processing is relatively simple.

Accordingly, The second embodiment has an advantage over the first embodiment in that implementation in an operating circuit is dramatically easy. In the second embodiment, same as the first embodiment, the driver accurately understands the position of white lines on the road surface and the distance to and direction of an obstacle such as another vehicle from the vehicle by watching the displayed image. This allows the driver to drive the vehicle with dramatically greater safety and accuracy than in related art examples.

As shown in FIG. 9B, only the position where the minimum value of the distance of an obstacle line is projected on a surface as well the obstacle area 6009 may be displayed as a boundary. In this case also, the driver can accurately understand the distance to and direction of an obstacle so that he/she can drive the vehicle safely and accurately.

Figure 10A:
FIGS. 10A to 10C show photos of examples of advantages of driving support apparatus according to the second embodiment of the invention.
Figure 10B:
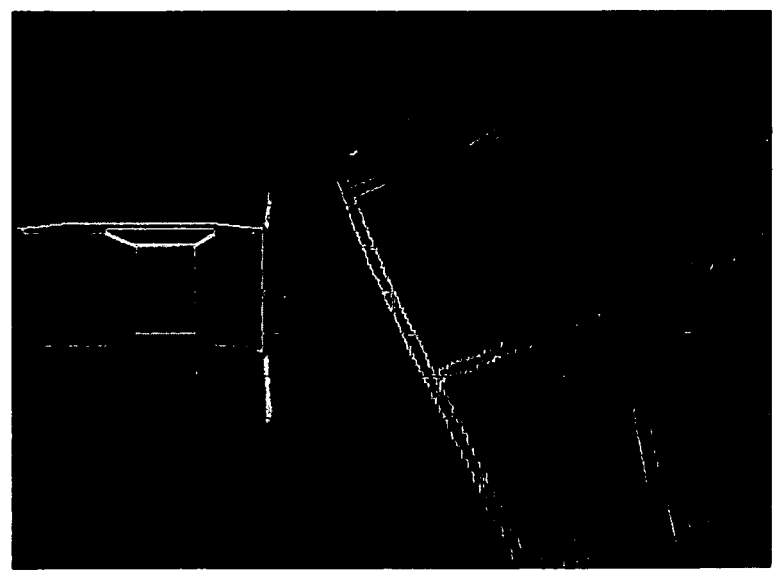
Figure 10C:
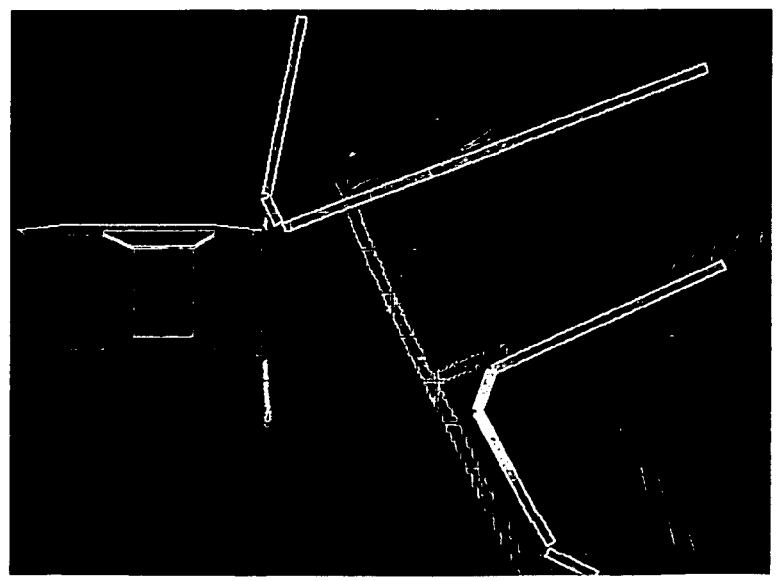

FIGS. 10A through 10C are examples showing the advantage of FIG. 9B in the actual pickup image. FIG. 10A shows an image picked up by a rear camera of the vehicle under parking. In this example, a fish-eye lens is used to image a wide range. The image includes space into which the vehicle is parking, a truck on the left and a car on the right. FIG. 10B shows an image compounded by using a pickup image of FIG. 10A by way of the related art. The computer graphic of the situation of the parking lot seen from above and the vehicle on the left is formed. Here, white lines on a road surface are compounded at accurate positions so that the driver can accurately understand the relation between the vehicle and the parking space. However, what is above the road surface is formed as if it existed farther than the actual position. Although sufficient spacing is provided between the truck and the vehicle in this image, there is actually a danger of collision. FIG. 10C shows an example of composition in this embodiment and shows the distance to an obstacle by using a white line. The white line allows the driver to check the actual distance to the truck at glance and recognize a danger of contact in the case he/she backs the vehicle farther.

Figure 9C:
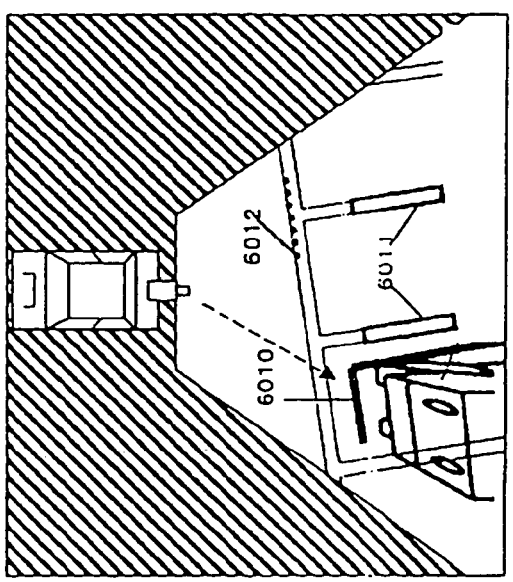

FIG. 9C is an example where the height of the obstacle line from the road surface as well as the minimum value of the distance is stored and the color and thickness of the boundary displayed is changed depending on the height from the road surface. In this example, an obstacle line 10 cm or less in height is represented in a yellow thin line, 10 to 15 cm in a red thin line, and 20 cm or more in a red thick line. By doing so, the white line 6012 detected due to dislocation of the road surface model from the actual model, such as in the case the road surface slopes a little, appears in a yellow thin line. A low curb 6011 less than 15 cm in height appears in a red thin line, and a boundary 6010 representing an obstacle such as another vehicle in a red thick line. As a result, the driver can notice a main obstacle first so that the influence of a noise caused by a rough road can be minimized.

Moreover, the boundary 6010 of an area at a certain height or above (corresponding to an obstacle) may blink on the screen of the composite image so as to attract further attention of the driver.

As shown in FIG. 9D, the value of the distance to a line 6013 perpendicular to the direction of distance from the vehicle passing through the closest point to the boundary 6010 of an area at a certain height or above may be displayed in the numeric value 6014 in order for the driver to recognize the actual distance value.

Further, the two image pickup means need not be positioned on a straight line in the vertical direction as shown in FIG. 11A. In the case of arrangement of FIG. 11A, while the point 7001 of the bumper of a rear vehicle which is in close proximity is a blind spot and is not seen from the upper image pickup means 3001, the image of the road surface of this portion can be compounded through road surface projection same as the related art by using an image obtained from the image pickup means 1001, as shown by the image projection means 7013.

In this case, same as the related art, there occurs dislocation of the actual bumper position from the composite image although the bumper position is in a direction 7002 sufficiently below seen from the image pickup means 1001 thus the dislocation is small.

As the upper image pickup means 3001 used for image composition through road surface projection, color camera with high resolution of 1024×768 pixels may be used. As the lower image pickup means 1001 for detection of parallax, a monochrome camera with 640×480 pixels resolution may be used. This reduces the cost of the lower image pickup means 1001 while obtaining a high-resolution color composite image.

As shown in FIG. 11B, the upper image pickup means 3001 may pick up distant areas with a high resolution while the lower image pickup means 1001 may pick up close areas with a high resolution. At the same time, as shown by the image projection means 7013 in the block diagram of FIG. 12, an image signal from the image pickup means 3001 may be used for composition of road surface in distant areas while an image signal from the image pickup means 1001 may be used for composition of road surface in close areas.

In this way, according to the second embodiment of the invention, it is possible to intuitively and accurately recognize the positions of obstacles around the vehicle and the surrounding situation by converting an image picked up by image pickup means mounted on a mobile unit to an image obtained through orthogonal projection from above, detecting the area other than the road surface as an obstacle area by using the parallax between the images picked up by a plurality of image pickup means and the parallax on a road surface model, compounding signals indicating the obstacle area to the converted image signals, and displaying the resulting image.

Third Embodiment

Driving support apparatus according to third embodiment of the invention allows the driver of a vehicle to intuitively and accurately recognize the positions of obstacles around the vehicle and the surrounding situation by converting an image picked up by image pickup means mounted on a mobile unit to an image seen from a virtual viewpoint above, detecting an unmatched area between the converted images as an obstacle area, compounding signals indicating the obstacle area to the converted image signals, and displaying the resulting image.

Figure 13:
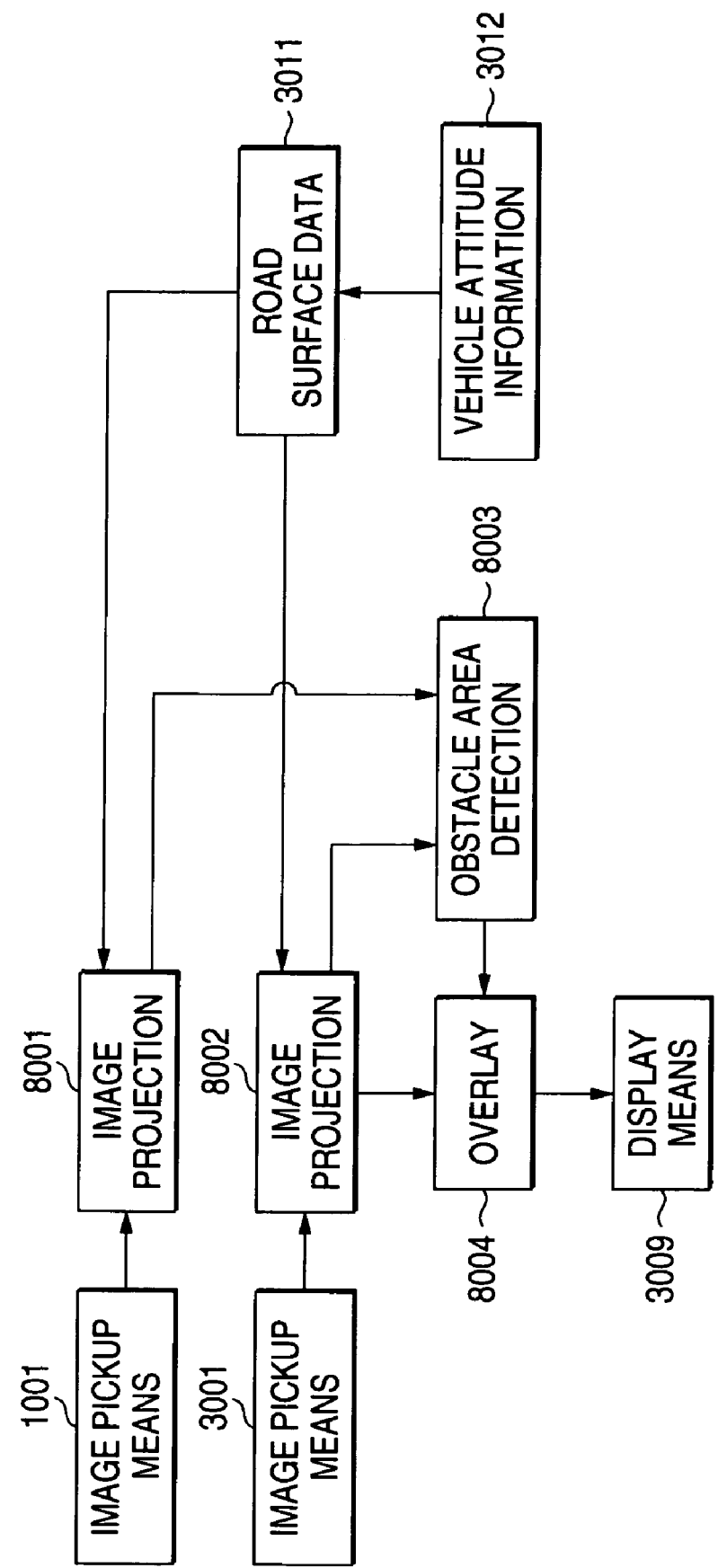
FIG. 13 is a block diagram showing the configuration of driving support apparatus according to the third embodiment of the invention.
Figure 14:
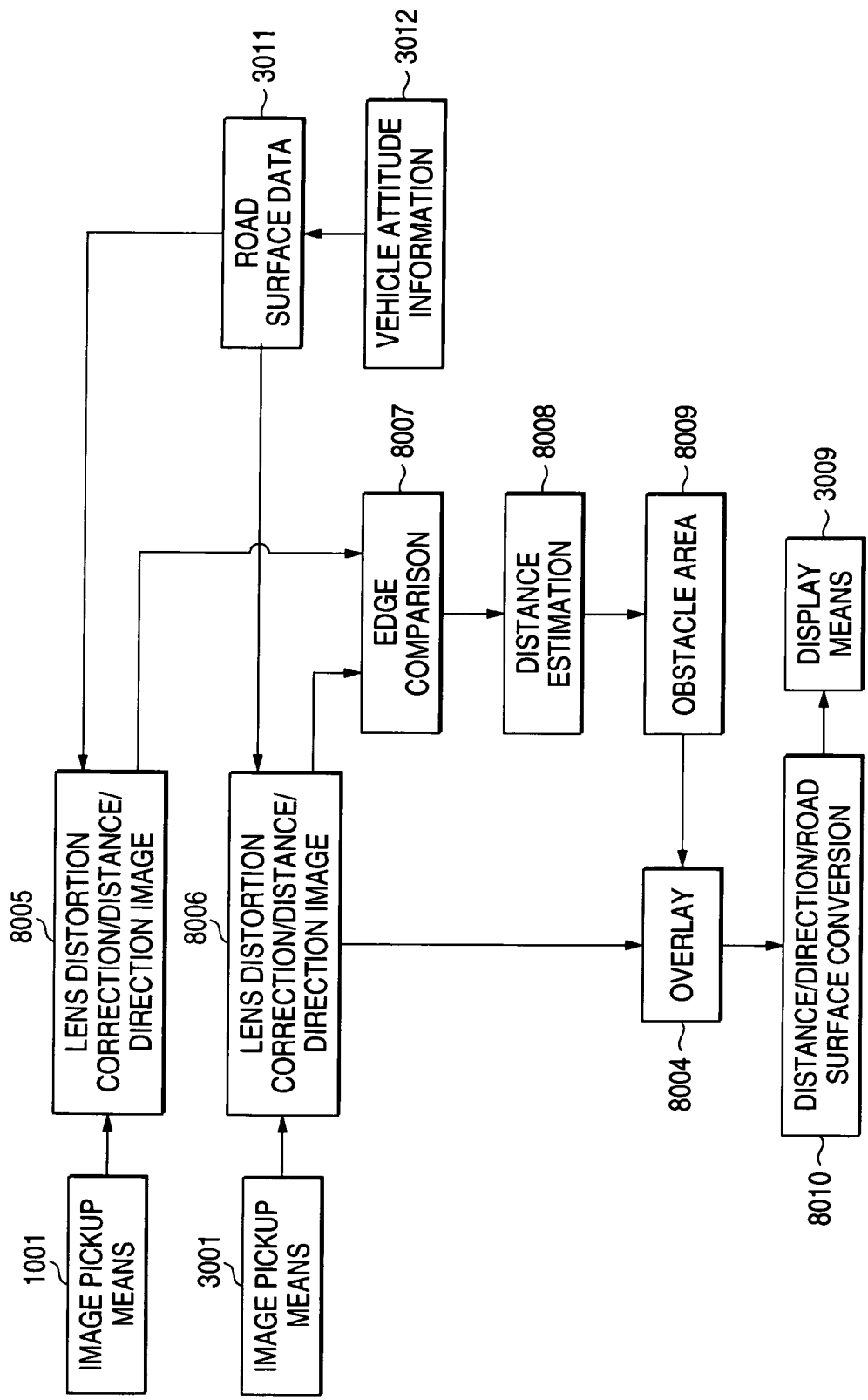

FIG. 13 is a block diagram of driving support apparatus according to the third embodiment of the invention. FIG. 14 is a block diagram showing a variation of FIG. 13. FIGS. 15 through 17 are schematic views explaining the operation of driving support apparatus according to the third embodiment of the invention. In FIGS. 13 and 14, block elements given the same numerals as those in FIG. 7 have the same configurations and features as those in FIG. 7.

Figure 15A:
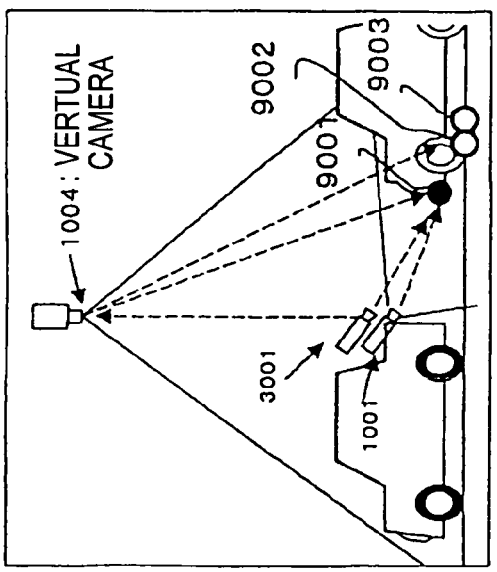
FIGS. 15A to 15D are schematic views explaining the operation of driving support apparatus according to the third embodiment of the invention.

In this embodiment, as shown in FIG. 15A, same as the first and second embodiments, images are input from two image pickup means 1001, 3001 arranged vertically with predetermined spacing between them. The two images are compounded with images from a virtual viewpoint 1002 to form composite images in a position projected onto a road surface based on the data from the road surface data means 3011 in the image projection means 8001, 8002, respectively.

In this practice, a point 9001 of a bumper of a rear vehicle positioned above a road surface is seen in a direction 9002 from the lower image pickup means 1001 when it is projected onto the road surface, and in a farther direction 9003 from the lower image pickup means 1001. In respective composite images, white lines on a road surface is formed in the same position as shown in FIGS. 15B and 15C, while the point 9001 of a bumper of a rear vehicle positioned above the road surface is formed in a different position.

Obstacle area detection means 8003 obtains the difference between the two composite images and detects an area where a difference exceeding a certain degree is found as an obstacle area. Areas are detected so that portions having horizontal edges above a road surface in the original pickup images will appear as an area 9004 and an area 9005, as shown in FIG. 15D.

Figure 15B:
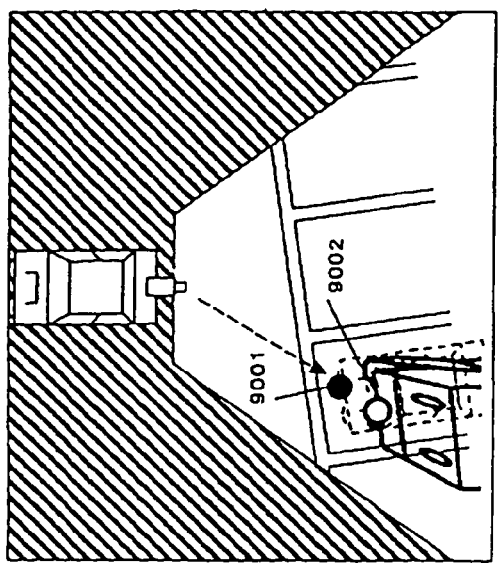
Figure 15C:
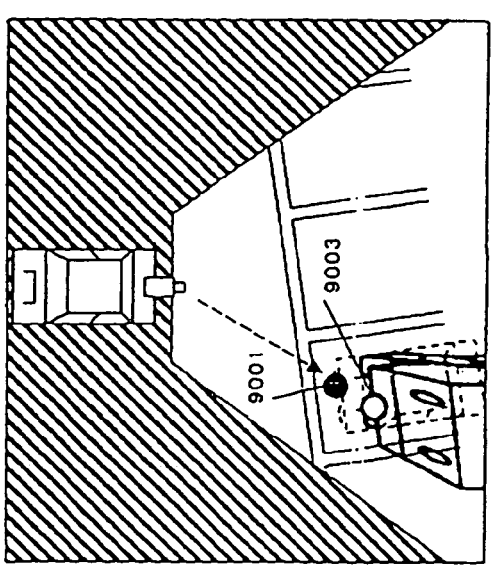
Figure 15D:
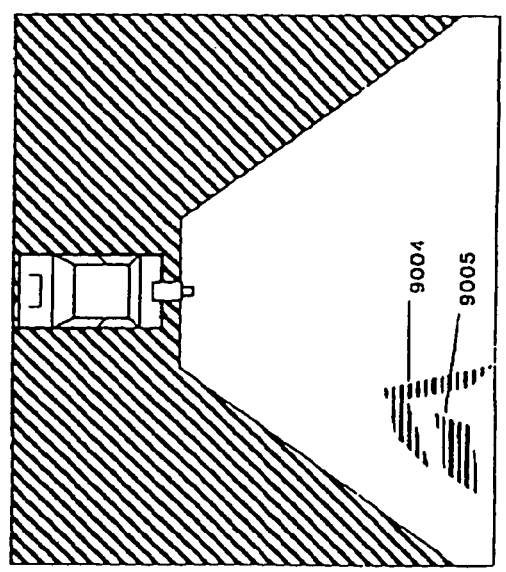
Figure 16A:
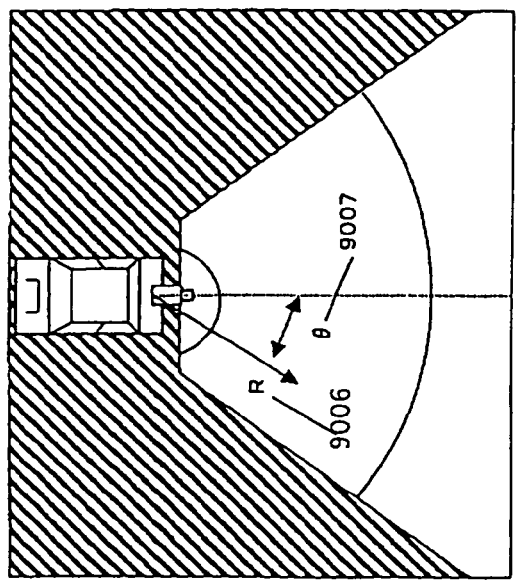
FIGS. 16A to 16D are schematic views explaining the operation of driving support apparatus according to the third embodiment of the invention and its variation.

Overlay means 8004, as shown in FIG. 16A, overlays the obstacle area shown in FIG. 15D on the image shown in FIG. 15B to form a composite image. In this practice, the obstacle areas 9004, 9005 are compounded as red translucent films in the image into an area where a vehicle exists in FIG. 15D.

Display means 3009 displays the output of the overlay means 8004. The driver watches the composite image to accurately distinguish white lines on a road surface from obstacles, unlike the related art examples. The driver can accurately understand the direction of an obstacle such as another vehicle from the vehicle although the distance to the other vehicle is not accurate in the image. This allows the driver to drive the vehicle more safely than in the related art examples.

Figure 16B:
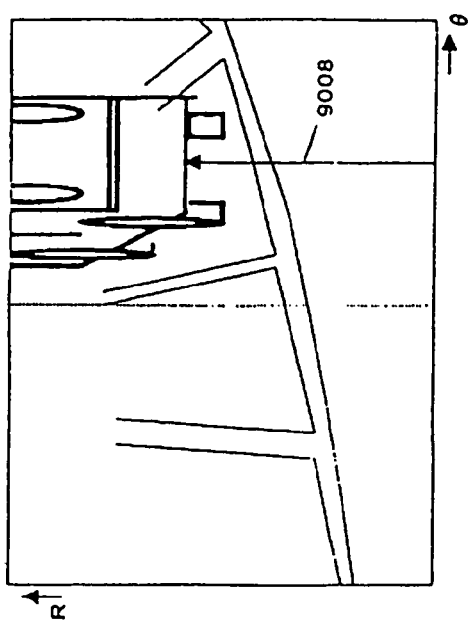
Figure 16C:
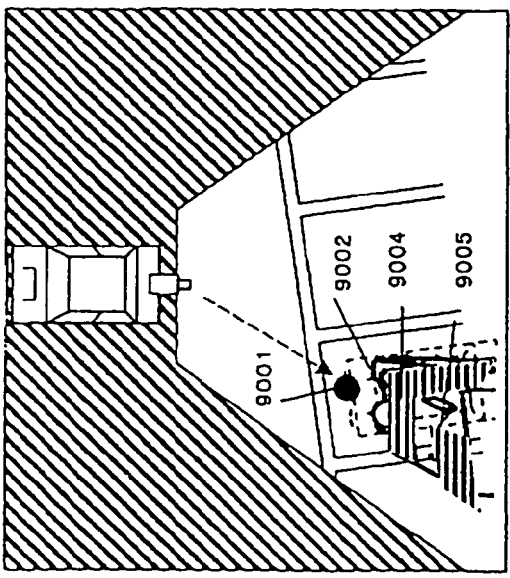
Figure 16D:
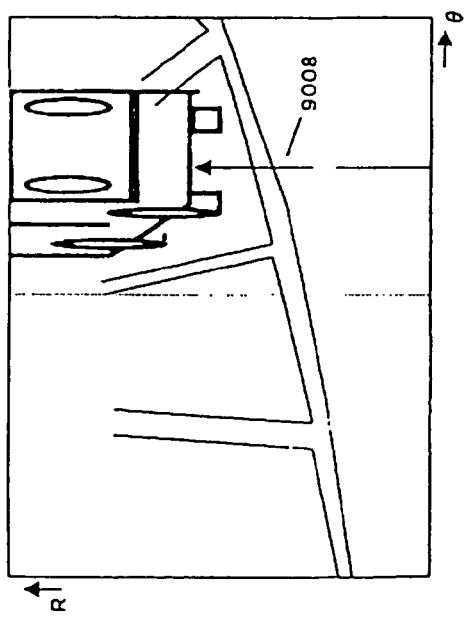

Variations of the third embodiment will be described referring to FIG. 14, FIGS. 16B through 16D, and FIGS. 17A through 17D. Pickup images from the image pickup means 1001, 3001 are converted to images on coordinates developed using the distance R from and direction θ of the image pickup means used when the images are projected onto a road surface as shown in FIG. 16B, by lens distortion correction/distance/direction image means 8005, 8006, respectively. In the case a lens distortion or distortion caused by the mounting angle is contained in the pickup image, the distortion amount is measured in advance for correction in the course of conversion. Images on coordinates developed using the distance R and direction θ are respectively shown in FIGS. 16C and 16D. An image from the image pickup means 3001 is shown in FIG. 16C. An image from the image pickup means 3001 is shown in FIG. 16D. While lines on a road surface are formed in the same positions while the edge position such as that of the bumper is formed in a farther position in FIG. 16D than in FIG. 16C.

Figure 17B:
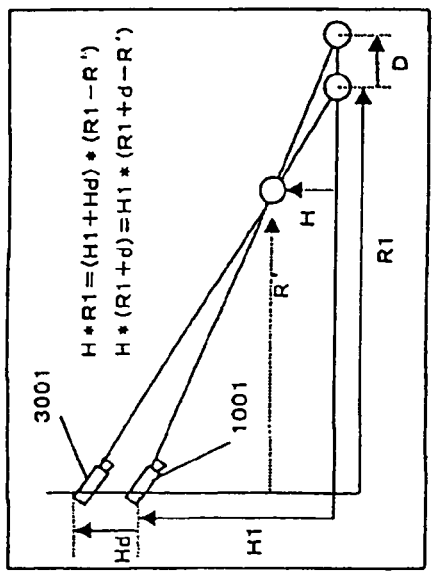
FIGS. 17A to 17D are schematic views explaining the operation of a variation of driving support apparatus according to the third embodiment.
Figure 17D:
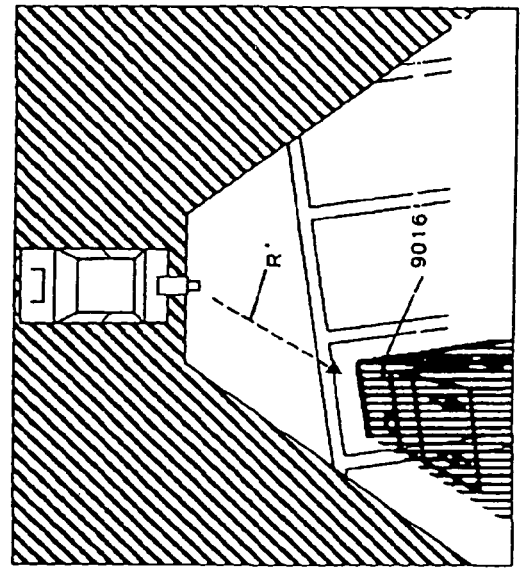
Figure 17A:
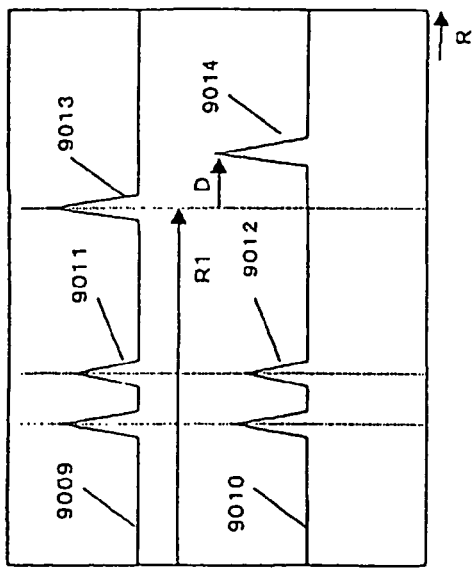

Edge comparison means 8007 compares the edge positions in accordance with the scan lines 9008 in FIGS. 16C and 16D. The edge in an image on the scan line 908 is shown in FIG. 17A. In this figure, an edge signal corresponding to FIG. 16C is represented by a numeral 9009 and an edge signal corresponding to FIG. 16D is represented by a numeral 9010. When the edge 9011 on the edge signal 9009 is detected in accordance with the scan line, an edge 9012 on the edge signal 9010 present in the same position is neglected because it is an edge on a road surface. When the edge 9013 on the edge signal 9009 is detected and an edge on the edge signal 9010 is absent in the same position, a distance d to the next-detected edge 9014 is detected. The distance R1 to the edge 9013 in this case and the distance d from the edge 9013 to the edge 9014 are output to the distance estimation means 8008.

Distance estimation means 8008 estimates the actual distance based on the distance to the edge 9013 and the distance d from the edge 9013 to the edge 9014. FIG. 17B shows the relation. Assuming the height of the image pickup means 1001 as H1, difference of height from the image pickup means 1001 to the image pickup means 3001 as Hd, the relation between the actual height H of the point and the distance R' is obtained from the input R1 and d, in the two relational expressions [4] and [5].

$$H*R1=(H1+Hd)*(R1-R') \quad \text{Expression [4]}$$

$$H*(R1+d)=H1*(R1+d-R') \quad \text{Expression [5]}$$

From these relational expressions, the actual height H of the point and the distance R' are estimated as in the following expressions [6] and [7].

$$R'=R1*(R1+d)*Hd/\{R1*Hd+d*(H1+Hd)\} \quad \text{Expression [6]}$$

$$H=H1*(H1+Hd)*d/\{Hd*R1+(H1+Hd)*d\} \quad \text{Expression [7]}$$

The estimated height H and distance R' are output to the obstacle area means 8009.

Figure 17C:
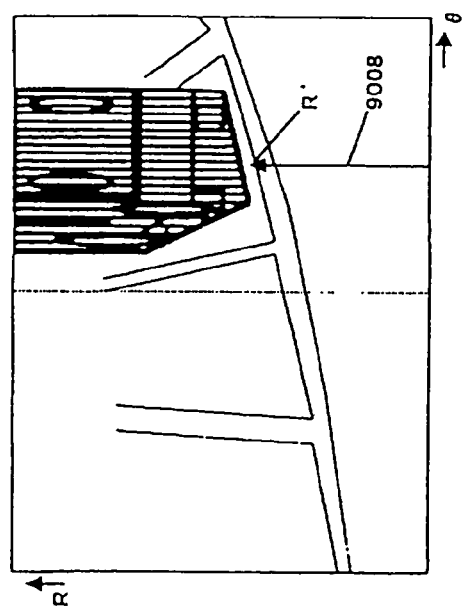

When the distance R' obtained with the height H exceeding a threshold is input, the obstacle area means 8009 draws a line at the distance R' on the scan line 9008 as shown in FIG. 17C and determines any farther area as an obstacle area Overlay means 8004 overlays the obstacle area on FIG. 16C as a converted image from the image pickup means 3001 as shown in FIG. 17C.

Distance/direction/road surface conversion means 8010 converts the coordinates of the resulting image developed using a distance to and direction of an ordinary image of a road surface seen from above, then outputs the image to the display means 3009.

An image displayed on the display means 3009 appears as an obstacle area in the position of the actual distance R1 even when the obstacle is above a road surface such as a bumper. The driver watches the display to drive the vehicle safely.

This embodiment has the following advantages (1) through (4).

(1) When an image is converted on coordinates developed in terms of distance and direction, a lens distortion or distortion caused by the mounting angle can be corrected.

(2) When a parallax is directly detected between two input images, corresponding distortions must be separately considered. In this embodiment, that process may be omitted.

(3) Even in the case the field angle differs between two image pickup means, the influence of the difference can be absorbed through this operation.

(4) In the case that edges are compared with each other after image projection onto a road surface, edge comparison must occur in terms of distance and direction. The distance and direction are not constant in an image projected onto a road surface so that memory access in the actual hardware is cumbersome. This is also true with determination of an obstacle area because the distance and direction are not constant. In this embodiment, edge comparison is made and an obstacle area is determined with the image converted on coordinates developed in terms of distance and direction. Distance and direction are used as coordinate axes on the converted image so that the aforementioned operation is made quite easy in the working hardware.

In this way, according to the third embodiment, the distance to and direction of an obstacle are represented more intelligibly and accurately by converting an image picked up by image pickup means mounted on a mobile unit to an image seen from a virtual viewpoint above, detecting an unmatched area between the converted images as an obstacle area, compounding signals indicating the obstacle area to the converted image signals, and displaying the resulting image. Thus the driver can intuitively and accurately recognize the positions of obstacles around the vehicle and the surrounding situation by watching the displayed image.

Fourth Embodiment

Driving support apparatus according to fourth embodiment of the invention allows the driver of a vehicle to intuitively understand more reliable portions and less reliable portions by converting an image picked up by image pickup means mounted on a mobile unit to an image seen from a virtual viewpoint above and compounding an accurate portion with smaller distortion into a light image and an inaccurate portion with greater distortion into a dark image.

Figure 18:
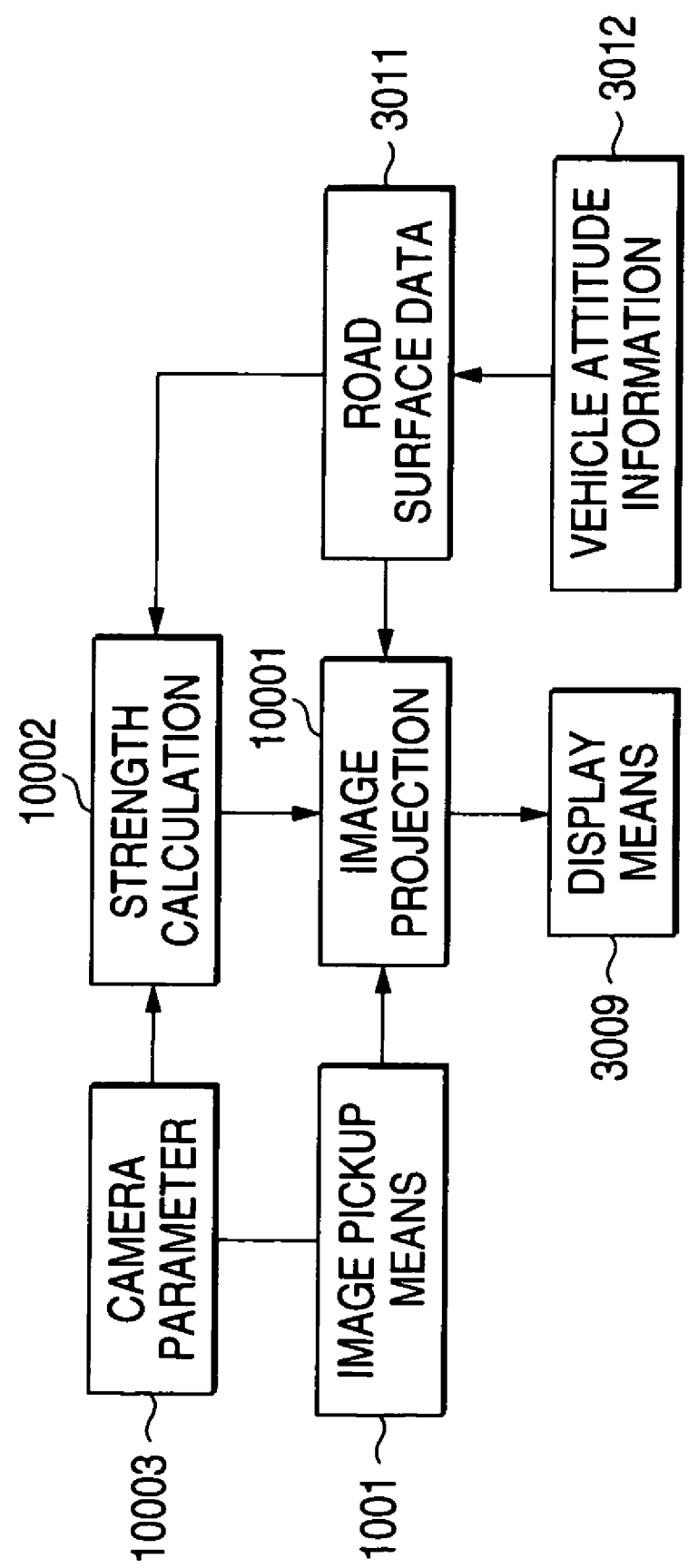
FIG. 18 is a block diagram showing the configuration of driving support apparatus according to the fourth embodiment of the invention.
Figure 19:
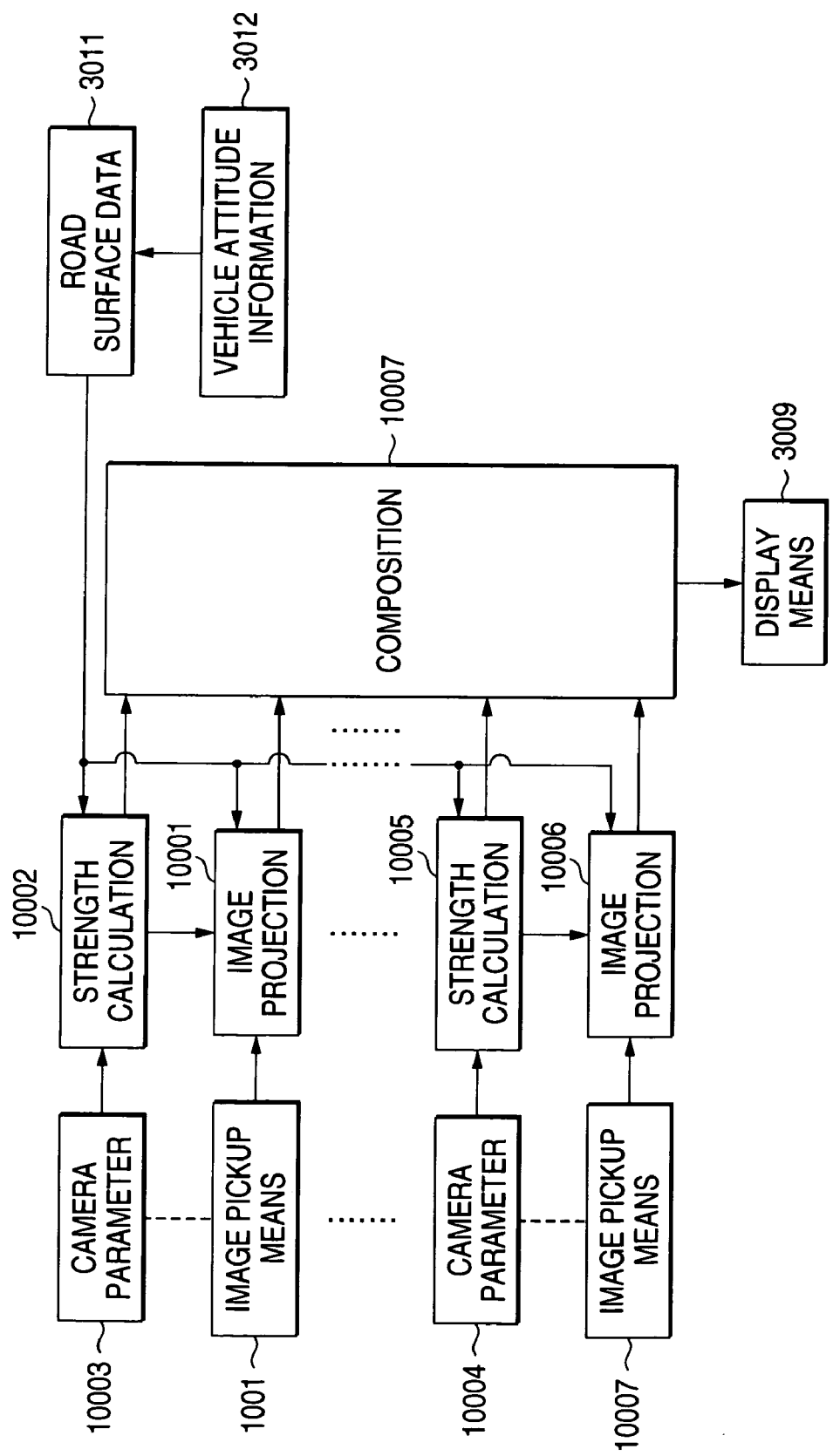
FIG. 19 is a block diagram showing the configuration of a variation of driving support apparatus according to the fourth embodiment of the invention.

FIG. 18 is a block diagram of driving support apparatus according to the fourth embodiment of the invention. FIG. 19 is a block diagram showing a variation of FIG. 18. FIGS. 20A to 20D are schematic views explaining the operation of driving support apparatus according to the fourth embodiment of the invention. In FIGS. 18 and 19, block elements given the same numerals as those in FIG. 7 have the same configurations and features as those in FIG. 7.

In this embodiment, an image is input from single image pickup means 1001 as shown in FIG. 18. In the image projection means 10001, an image is compounded in a position where the input image is projected onto a road surface using the data from the road surface data means 3011 based on the input data. In this practice the strength calculation means 10002 calculates and determines the strength of projecting the image onto a road surface based on the relation between a camera parameter 10003 of the image pickup means 1001 and the data from the road surface data means 3011.

Figure 20B:
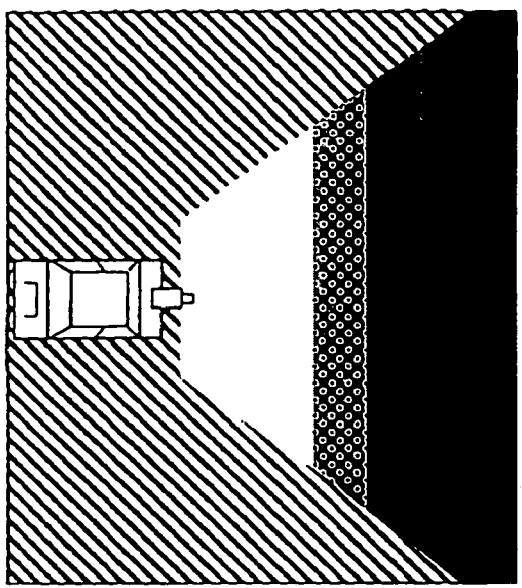
FIGS. 20A to 20D are schematic views explaining the operation of driving support apparatus according to the fourth embodiment of the invention and its variation.
Figure 20D:
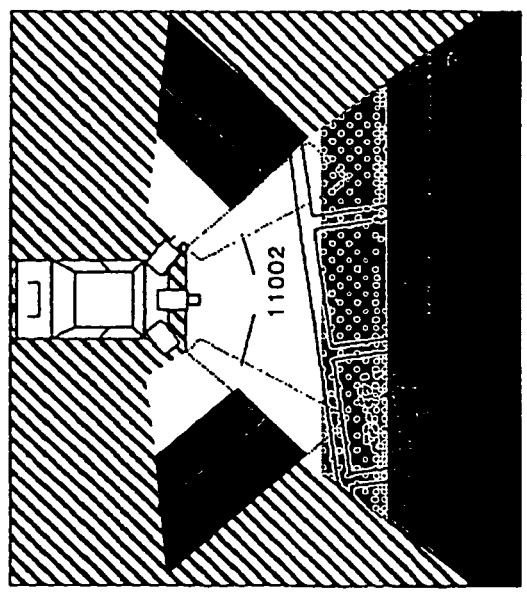
Figure 20A:
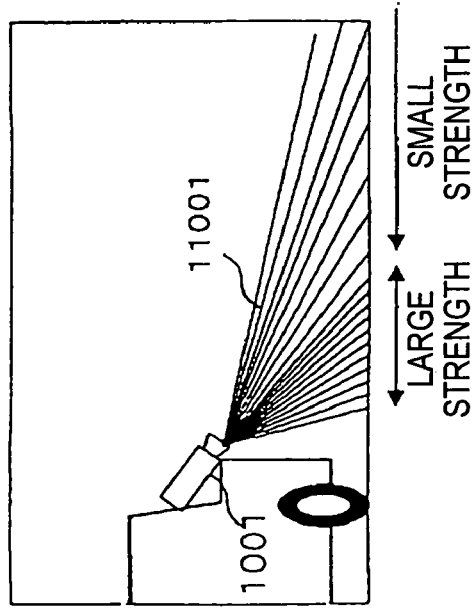

As shown in FIG. 20A, a light beam 11001 constant per pixel from the image pickup means 10001 is assumed. The strength K of projection of the light bean onto a road surface is calculated in the following expression [8] from the area A where the single pixel is projected onto a road surface and the angle θ between the light beam and the road surface.

Expression [8] will be outlined. The larger the area A is, the smaller the strength becomes. The closer the angle to the road surface approaches the right angle, the greater the strength becomes. The strength is gripped at 1.0.

$$K'=\alpha\cdot\sin(\theta)/S \qquad \text{Expression [8]}$$

if (K'>1.0) K=1.0
else K=K' where α is a constant representing the amplification strength.

Through calculation of the strength, as shown in FIG. 20A, a road surface near the image pickup means 1001 has a great strength while a road surface distant from the image pickup means 1001 has a small strength. An image compounded in accordance with the strength value is formed into an image of a certain brightness while the strength K is 1.0 up to a road surface certain distance from the image pickup means 1001. Exceeding this limit, the resulting image becomes darker as the distance increases.

Figure 20C:
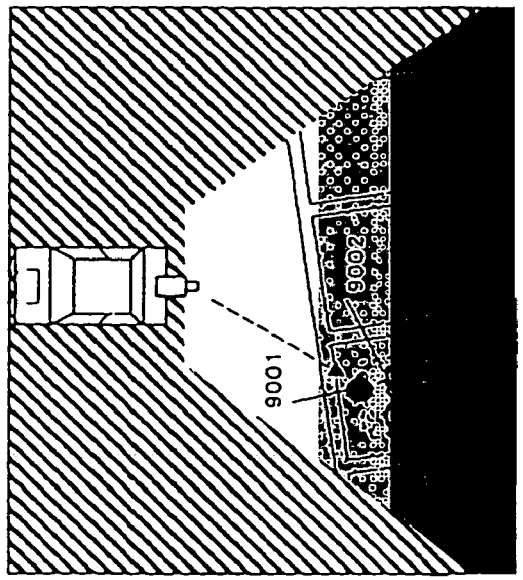

An image compounded based on the input image from the image pickup means 1001 has a dark distant portion where distortion and distance error are large, as shown in FIG. 20C.

The driver can watch the nearby accurate portion which has a small amount of errors in the resulting image, unlike the related art examples. The driver intuitively recognizes that the information on the distant portion with a large amount of errors and distortion is less accurate because the portion appears in a dark image. Thus, the driver can intuitively understand the reliability of each portion in the composite image although he/she cannot accurately understand the distance to an obstacle. This allows the driver to drive the vehicle more safely than in the related art examples.

A variation shown in FIG. 19 is an extended version of FIG. 18 and has a plurality of image pickup means. Concerning a pickup image from each image pickup means 1001 . . . 10007, the strength of projection of the image onto a road surface is calculated and determined by strength calculation means 10002 . . . 10005 based on the relation of each camera parameter 10003 . . . 10004 and road surface data 3011, and an image is compounded by the image projection means 10001, 10006 in accordance with the strength obtained.

The image obtained through composition of a road-surface-projected image is further compounded into a single image by composition means 10007. In this practice, composition is made in accordance with weighting to reflect each strength of image projection onto a road surface and the resulting image is displayed on the display means 3009. The displayed image is a road-surface-projected image formed based on images from three image pickup means, as shown for example in FIG. 20D.

In this example, the image pickup means in the rear center of the vehicle is of a high resolution while the right and left image pickup means are of a low resolution as auxiliary means. Thus, the area where the right and left image pickup means project images has a large area per pixel so that only the area in close proximity is compounded into a light image. The area where the center image pickup means projects images has a relatively small area per pixel so that a light image up to a distant portion is obtained. In an area 11002 where images projected by these image pickup means overlap with each other, a high-strength projected image from the center image pickup means is greatly weighted in composition so that the obtained composite image is more reliable.

The driver can intuitively understand the reliability of each portion of a composite image from a plurality of image pickup means by watching this composite image, and drive the vehicle more safely than in the related art examples.

In this way, according to the fourth embodiment of the invention, the driver can intuitively understand more reliable portions and less reliable portions by converting an image picked up by image pickup means mounted on a mobile unit to an image seen from a virtual viewpoint above and compounding an accurate portion with smaller distortion into a light image and an inaccurate portion with greater distortion into a dark image. This prevents dangerous driving such as moving the vehicle fast in the direction of a less reliable portion, which prompts safer driving.

While only the brightness of an image is varied in accordance with the calculated strength in the aforementioned fourth embodiment, colors may be varied. By mixing gray or white in a portion with smaller strength, an effect of mist may be produced. In this way, it is possible to prevent the driver from moving the vehicle fast in the direction of smaller strength, which prompts safer driving.

Fifth Embodiment

Driving support apparatus according to fifth embodiment of the invention allows the driver of a vehicle to intuitively and accurately recognize the positions of obstacles around the vehicle and the surrounding situation by converting an image picked up by image pickup means to an intermediate image which uses a distance or a height from the image pickup means as a coordinate, estimating the actual distance to an unmatched area between the intermediate images and correcting the position of the area, detecting the corrected area as an obstacle area, compounding signals indicating the obstacle area in the intermediate image, converting the composite image to an ordinary image on coordinates, and displaying the resulting image.

Figure 21:
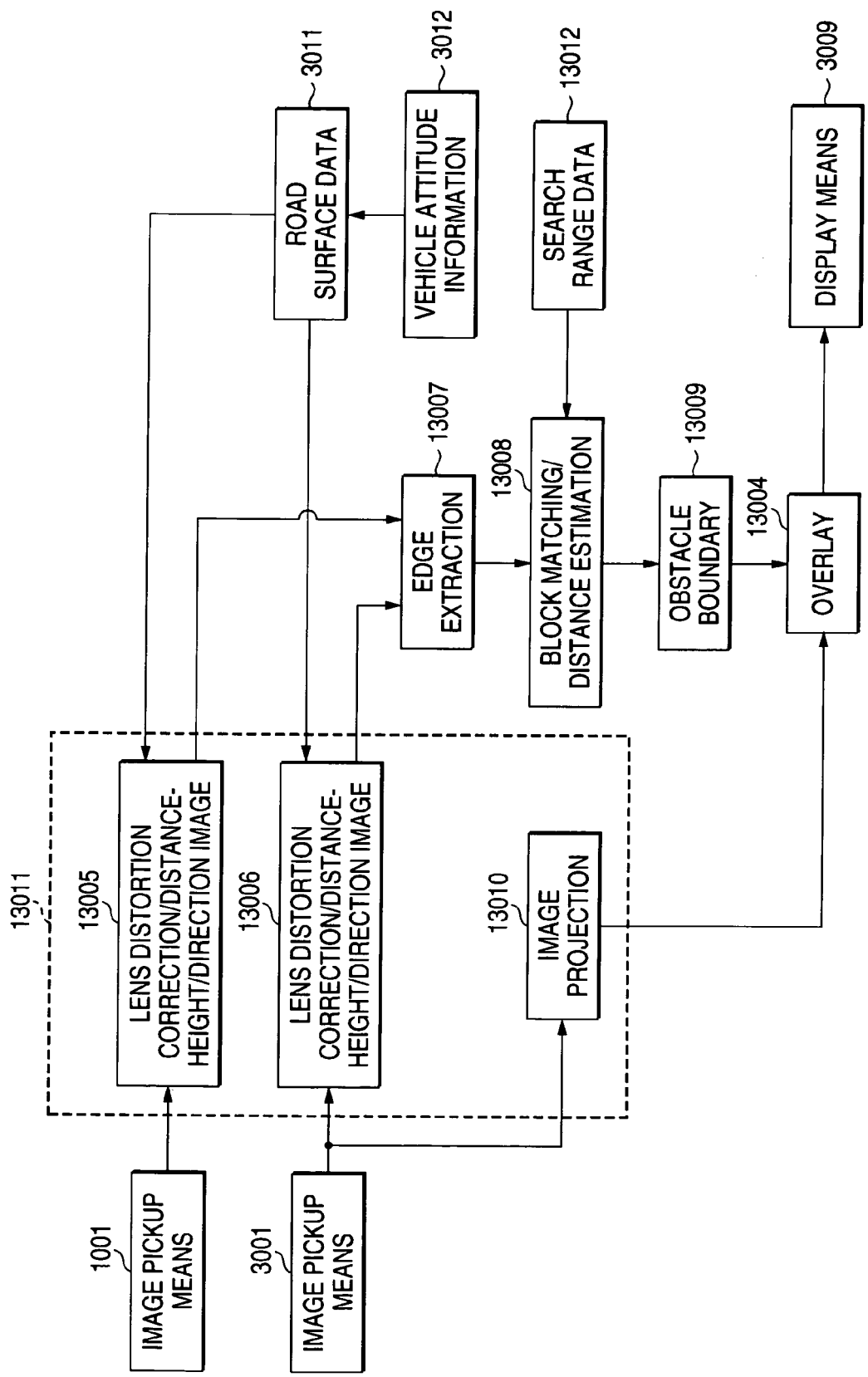
FIG. 21 is a block diagram showing the configuration of driving support apparatus according to the fifth embodiment of the invention.
Figure 27:
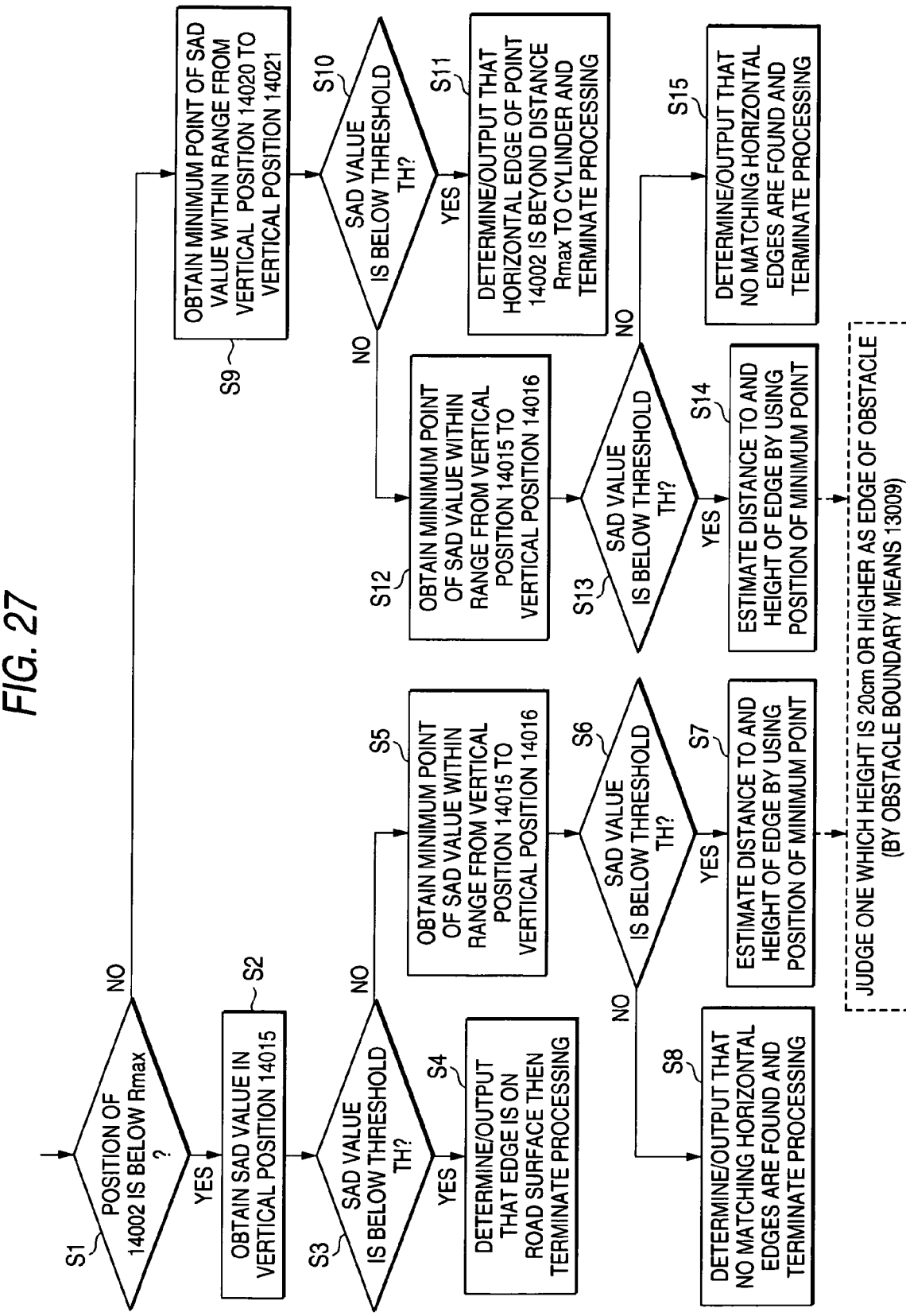
FIG. 27 is a flowchart explaining the search processing in driving support apparatus according to the fifth embodiment of the invention.

FIG. 21 is a block diagram of driving support apparatus according to the fifth embodiment of the invention. FIGS. 22 through 26 are schematic views explaining the operation of driving support apparatus according to the fifth embodiment of the invention. FIG. 27 is a flowchart explaining the search processing. In FIG. 21, block elements given the same numerals as those in FIG. 7 have the same configurations and features as those in FIG. 7.

Figure 22A:
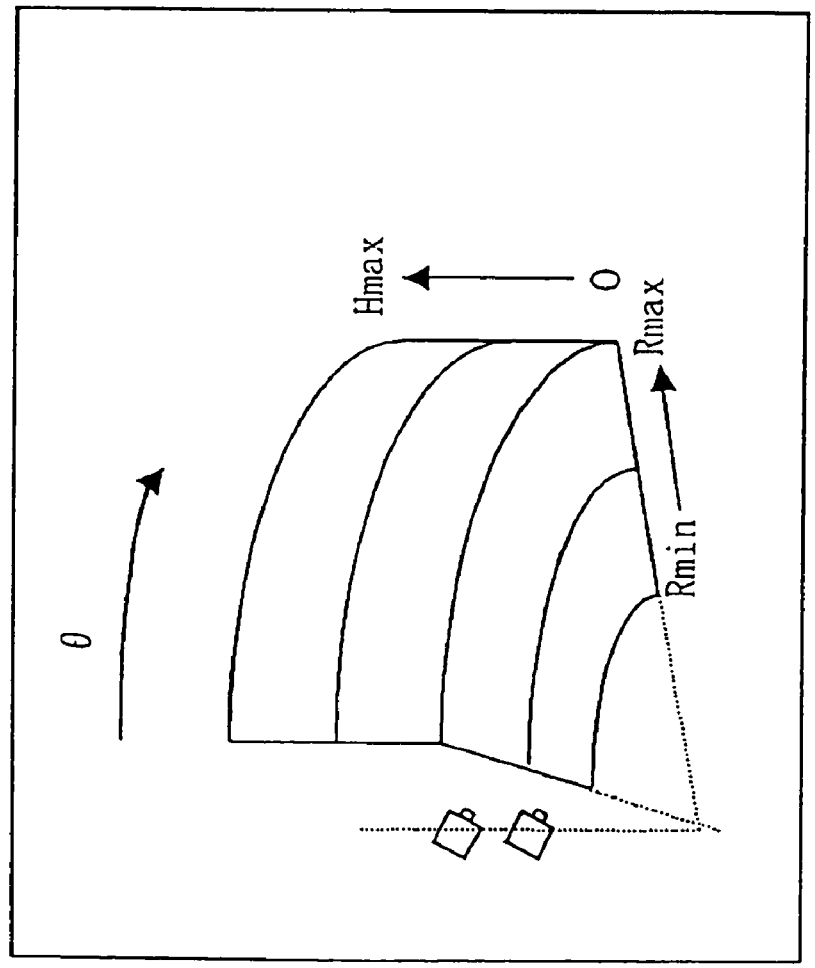
FIGS. 22A and 22B are schematic views explaining the operation of driving support apparatus according to the fifth embodiment of the invention.
Figure 22B:
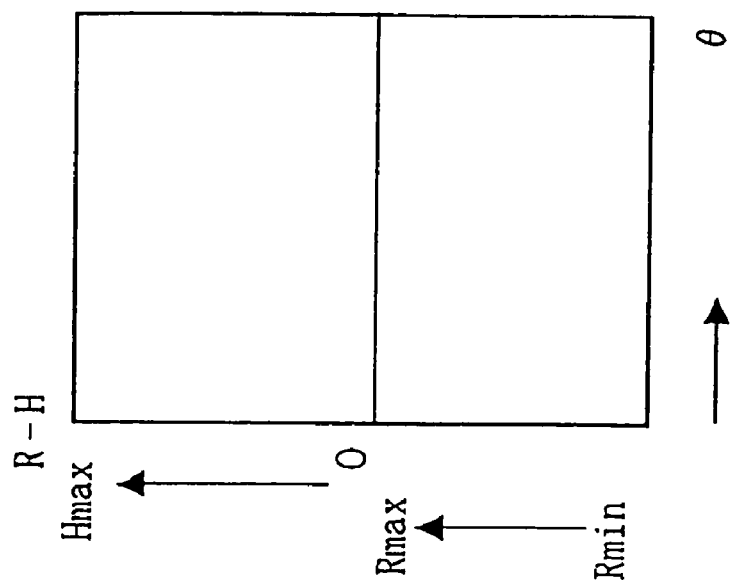

In this embodiment, each image pickup means 1001, 3001 has a fish-eye lens. Images picked up by the image pickup means 1001, 3001 are respectively input to the lens distortion correction/distance-height/direction image means 13005, 13006. In the lens distortion correction/distance-height/direction image means 13005, 13006, it is assumed that an input image is projected onto a road surface up to a predetermined distance Rmax from the image pickup means and onto a cylinder beyond the distance Rmax as shown in FIG. 22A. The image is then converted to an image on coordinates developed using the distance R on the road surface or height H on the cylinder and direction θ.

Figure 23B:
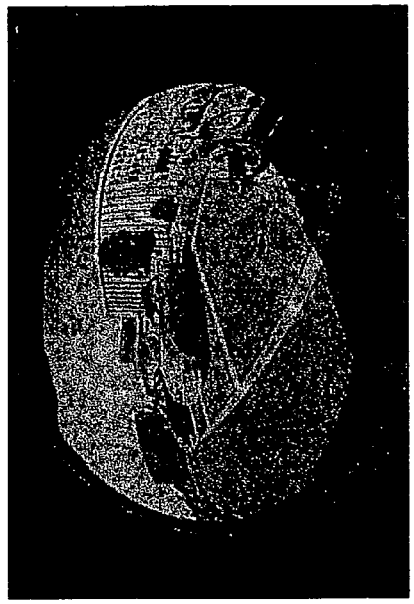
FIGS. 23A to 23D show schematic photos showing the operation of driving support apparatus according to the fifth embodiment of the invention.
Figure 23D:
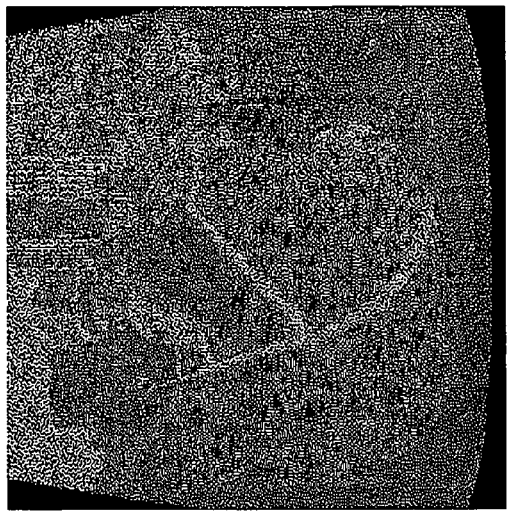
Figure 23A:
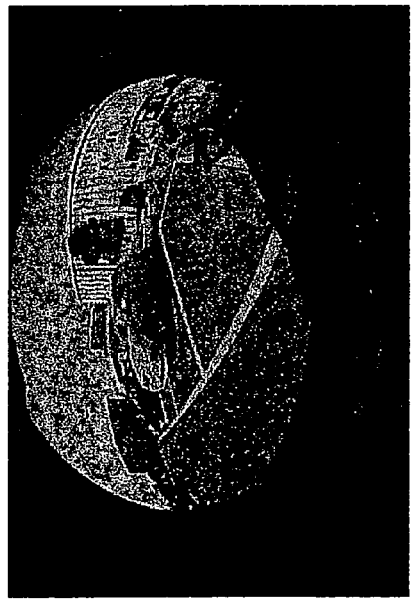
Figure 23C:
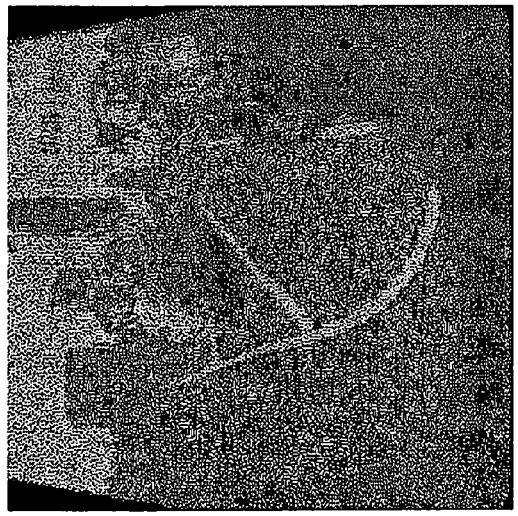

In the case a lens distortion or distortion caused by the mounting angle is contained in the pickup image, the distortion amount is measured in advance for correction in the course of conversion. For example, the pickup images shown in FIGS. 23A, 23B appear as shown in FIGS. 23C, 23D, respectively. The predetermined distance on the road surface Rmax=300 cm. Rmax=0 cm and Hmax=200 cm in FIG. 22A.

Figure 24B:
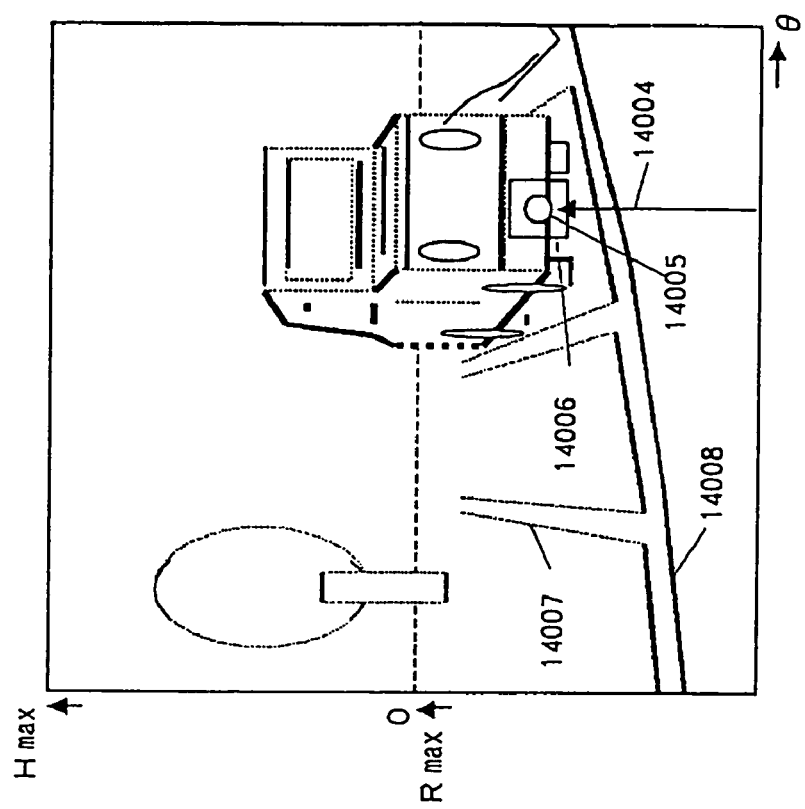
FIGS. 24A and 24B are schematic views explaining the operation of driving support apparatus according to the fifth embodiment of the invention.
Figure 24A:
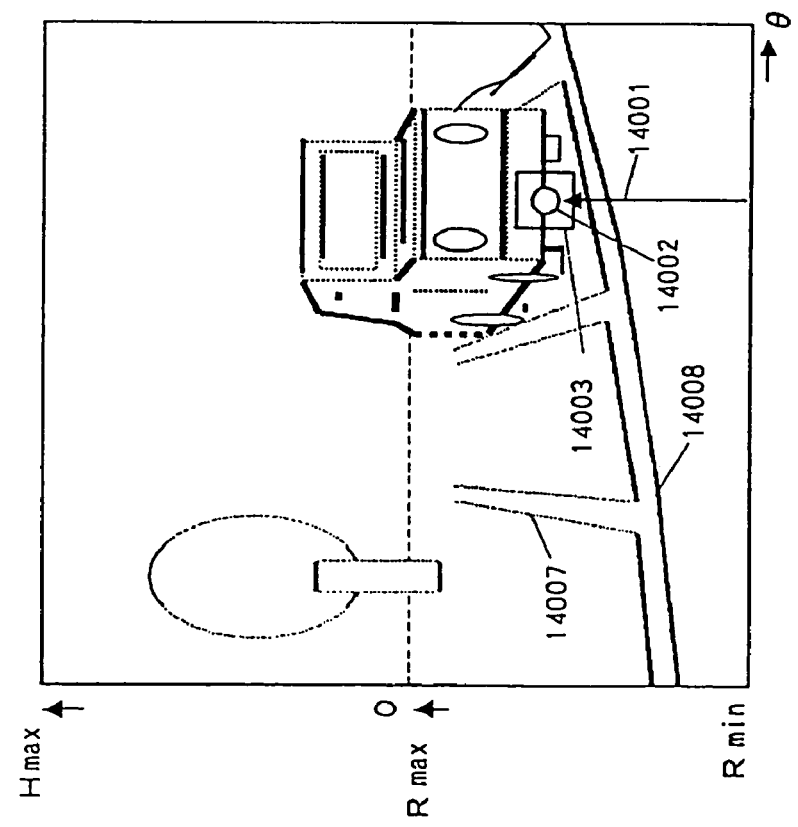

Edge extraction means 13007 extracts the horizontal edge of the respective converted images by obtaining the difference of signals apart from each other by five pixels in vertical direction. FIGS. 24A, 24B show the images with horizontal edges extracted from the converted images output from lens distortion correction/distance-height/direction image means 13005, 13006, respectively. FIG. 24A is an image seen from the upper image pickup means 3001 and FIG. 24B from the other image pickup means. As shown with a dashed line 14007 in the figure, an oblique edge close to vertical direction appears in an inconspicuous representation. As shown with a thick solid line 14008, a horizontal edge is emphasized.

Horizontal block matching/distance estimation means 13008 scans the edge position in accordance with a scan line 14001, and detecting the maximum point 14002 of the edge, stores image signals of a block 14003 comprising 10 pixels in vertical direction and 10 pixels in horizontal direction.

Next, the horizontal block matching/distance estimation means 13008 detects a block 14006 having the most similar data to that of the stored block 14003 within the range according to search range data means 13012. In this practice, the distance is estimated assuming the difference between the center point 14005 of the block 14006 and the vertical position of the maximum point 14002 of the edge as parallax data on the converted image.

Operation of the search range data means 13012 and the horizontal block matching/distance estimation means 13008 will be detailed referring to the flowchart of FIG. 27. The search range data means 13012 stores the data corresponding to the vertical position of the center position 14002 of the block 14003. As shown by the point 14003 in FIG. 25A, in the case the position of the point 14002 seen from the upper image pickup means 3001 corresponds to a road surface, that is, in the case the position of the point 14002 is below Rmax in FIG. 24A, vertical positions 14015, 14016 of a point 14013 on a road surface and a point 14014 at a distance of 50 cm from the image pickup means seen from the lower image pickup means 1001 are stored in the search range data means 13012. Note that, the vertical position 14015 of the point 14013 on a road surface seen from the lower image pickup means 1001 is the same as the vertical position of the point 14002 because both of the converted images assume a road surface.

Figure 25A:
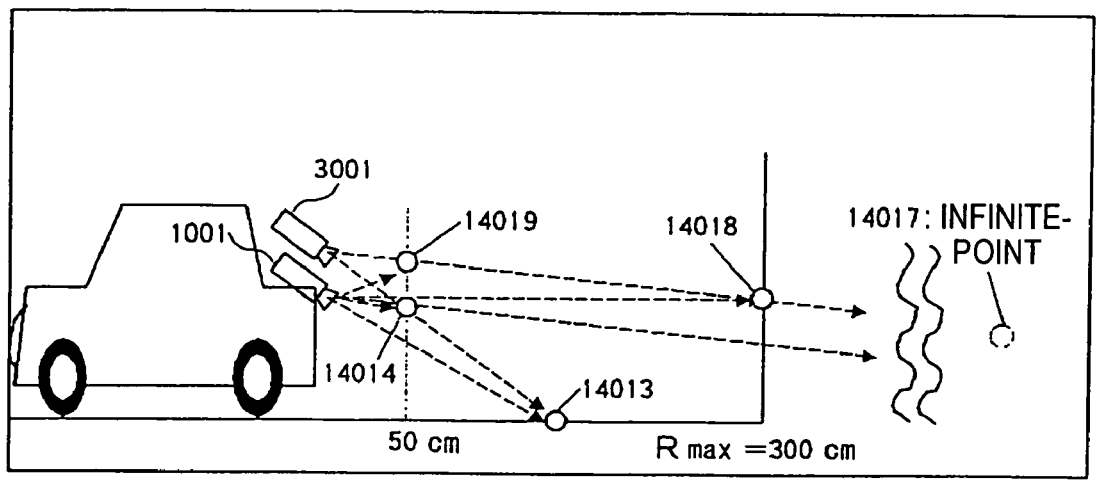
FIGS. 25A to 25C are schematic views explaining the operation of driving support apparatus according to the fifth embodiment of the invention.
Figure 25B:
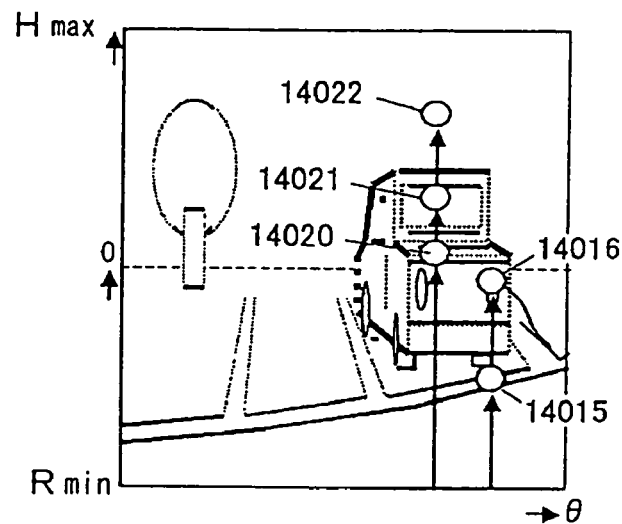

As shown in FIG. 25A, in the case the position of the point 14002 seen from the upper image pickup means 3001 corresponds to a cylinder, that is, in the case the position of the point 14002 is above Rmax in FIG. 24A, vertical positions 14020, 14021, 14022 of an infinite-point 14017, a point on the cylinder 14018 and a point 14019 at a distance of 50 cm from the image pickup means seen from the lower image pickup means 1001 are stored in the search range data means 13012. Note that, in this case also, the vertical position 14021 of the point on the cylinder 14018 seen from the lower image pickup means 1001 is the same as the vertical position of the point 14002 because both of the converted images assume a cylinder.

Based on the search range data, a search is made in accordance with the flow shown in FIG. 27.

First, it is determined whether the position of the point 14002 corresponds to a road surface or a cylinder (Step S1).

In the case it is determined that the position of the point 14002 corresponds to a road surface (YES in Step S1), sum of the absolute values of differences of block signals (SAD) is obtained at a vertical position 14015 (Step S2). In the case the SAD value is smaller than a threshold TH (YES in Step S3), block data matching is determined and processing is terminated with a determination output that the horizontal edge of the point 14002 is an edge on a road surface (Step S4). In the case the SAD value is greater than the threshold TH (NO in Step S3), a search is made within the range from a vertical position 14015 to a vertical position 14016 for a position where the SAD value is smallest (Step S5). In the case the smallest SAD value is smaller than the threshold TH (YES in Step S6), the distance and the height from the road surface are obtained assuming the difference between the position and the vertical position of the point 14002 as parallax data, and processing is terminated with the obtained data output (Step S7). In the case the smallest SAD value is greater than the threshold TH (NO in Step S6), processing is terminated with a determination output that the no matching horizontal edges are found (Step S8).

In the case that it is determined that the position of the point 14002 corresponds to a cylinder (NO in Step S1), the smallest SAD value is obtained within the range from a vertical position 14020 to a vertical position 14021 (Step S9). In the case that the smallest SAD value is smaller than the threshold TH (YES in Step S10), it is determined that block data matched and processing is terminated with a determination output that the horizontal edge of the point 14002 is beyond the distance Rmax to the cylinder (Step S11). In the case the smallest SAD value is greater than the threshold TH (NO in Step S10), a search is made within the range from a vertical position 14021 to a vertical position 14022 for a position where the SAD value is smallest (Step S12). In the case the smallest SAD value is smaller than the threshold TH (YES in Step S13), the distance and the height from the road surface are obtained assuming the difference between the position and the vertical position of the point 14002 as parallax data, and processing is terminated with the obtained data output (Step S14). In the case the smallest SAD value is greater than the threshold TH (NO in Step S13), processing is terminated with a determination output that the no matching horizontal edges are found (Step S15).

By way of the processing flow, it is possible to determine and remove with small amount of processing any horizontal edge on a road surface or at a distance which are not related to obstacles. Processing is concentrated on the edges related to obstacles, so that the distance to and height of an edge related to an obstacle can be calculated with very small amount of processing in total.

Figure 25C:
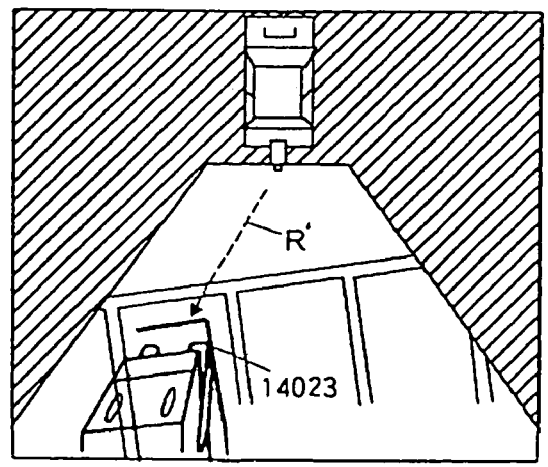
Figure 26:
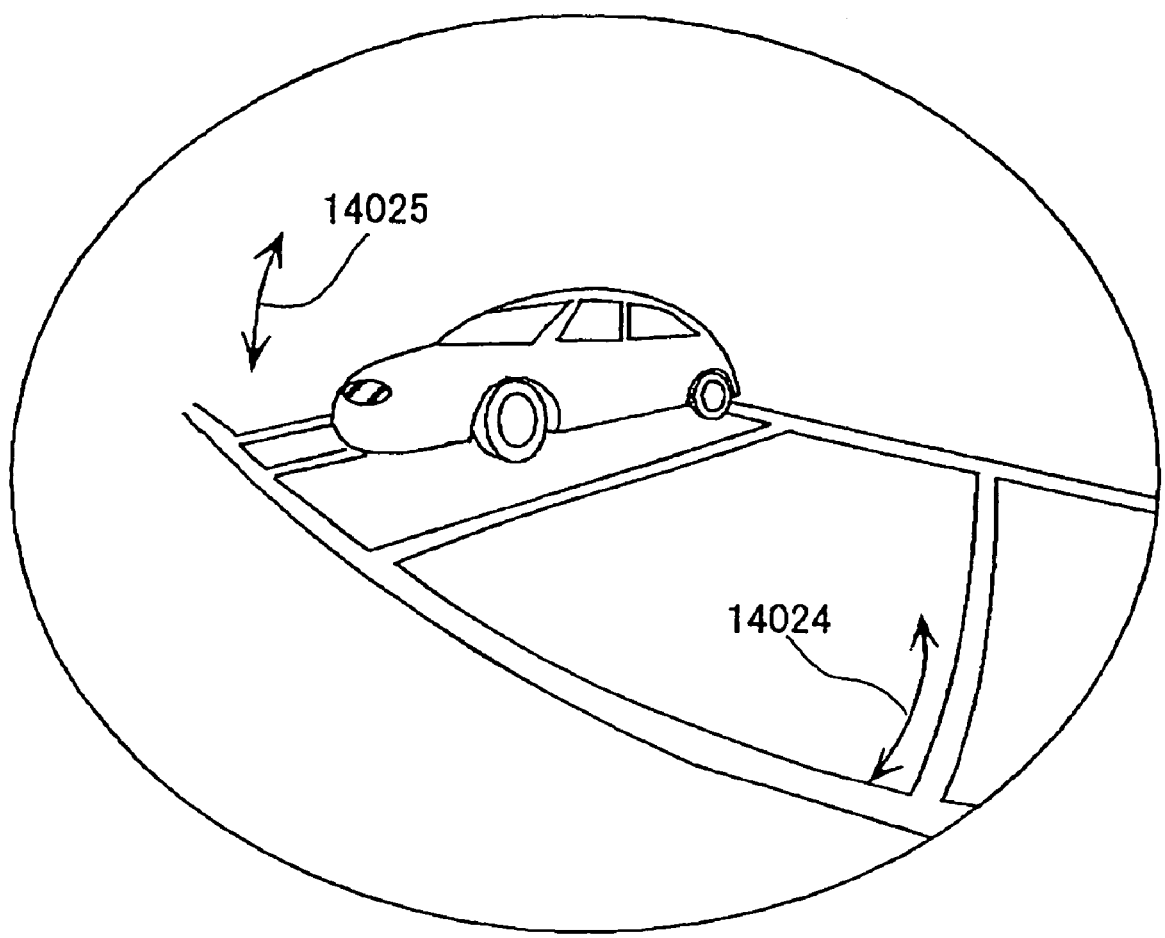
FIG. 26 is a schematic view explaining the operation of driving support apparatus according to the fifth embodiment of the invention.

Obstacle boundary means 13009 determines as obstacle edges those edges whose height exceeds 20 cm among the edges whose distance and height have been detected as shown in FIG. 27. The obstacle boundary means 13009 then draws a line at the location of the distance R' as shown in FIG. 25C, and as a result, a set of horizontal edges becomes a line 14023 indicating an obstacle border.

Image projection means 13010 separately compounds an image directly seen from an overhead vertical viewpoint based on an image from image pickup means 3001. Overlay means 13004 overlays the obstacle on the image from the image projection means 13010 as shown in FIG. 25C.

The overlay-composite image is displayed on display means 3009. As shown in FIG. 25C, in the image displayed, an obstacle border line is displayed in the position of the actual distance even in the case an obstacle above a road surface such as a bumper exists. The driver can watch the displayed image to drive the vehicle safely.

This embodiment has the advantages (1) through (8).

(1) When an image is converted on coordinates developed in terms of distance and direction, a lens distortion or distortion caused by the mounting angle can be corrected.

(2) When a parallax is directly detected between two input images, corresponding distortions must be separately considered. In this embodiment, that process may be omitted.

(3) Even in the case the field angle differs between two image pickup means, the influence of the difference can be absorbed through this operation.

(4) As shown in FIG. 22A, by using a converted image assuming a cylinder as well as a road surface, it is possible to detect an obstacle which does not appear in a road-surface-projected image because it is in a high position with respect to image pickup means and display the corresponding obstacle border line on the displayed image.

(5) By way of the processing flow shown in FIG. 27, it is possible to determine and remove with small amount of processing any horizontal edge on a road surface or at a distance which are not related to obstacles. Processing is concentrated on the edges related to obstacles, so that the distance to and height of an edge related to an obstacle can be calculated with very small amount of processing in total.

(6) By providing search range data means 13012, a search is limited to a necessary range so that the distance to and height of an edge related to an obstacle can be calculated with very small amount of processing in total.

(7) As shown in FIG. 22A, by using a converted image assuming a cylinder as well as a road surface, the search range data is determined only in the vertical position of a horizontal edge 14002 and does not depend on the horizontal position. This dramatically reduces the corresponding memory amount.

For example, in the case stereo matching is made using an image from image pickup means having a fish-eye lens as in the related art examples, the search range is represented in curves 14024, 140125 which depend on the vertical and horizontal positions on the screen. Storing the curve data requires a very large amount of memory. In this embodiment, the memory is dramatically reduced and processing is implemented with a simple configuration.

(8) While an accuracy above per-pixel accuracy is required in the related art stereo matching, an SAD value is obtained to the per pixel accuracy in the actual search. This quantization noise has an adverse effect. This embodiment avoids the adverse effect.

Figure 28A:
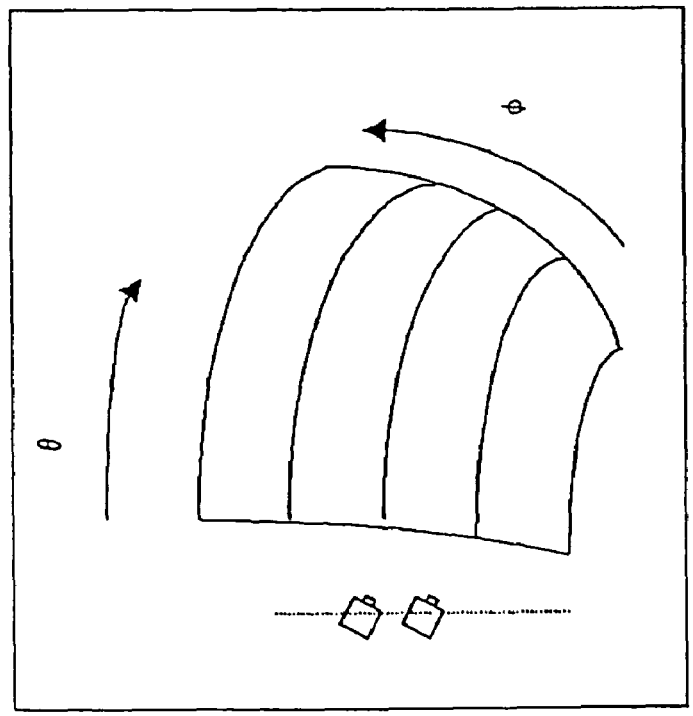
FIGS. 28A to 28C are schematic views showing the configuration of a variation of driving support apparatus according to the fifth embodiment of the invention.
Figure 28B:
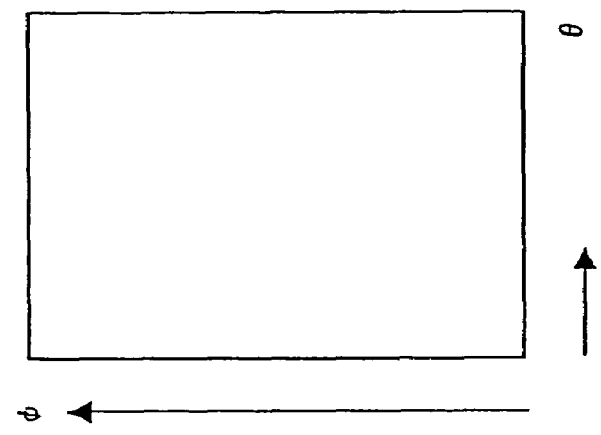
Figure 28C:
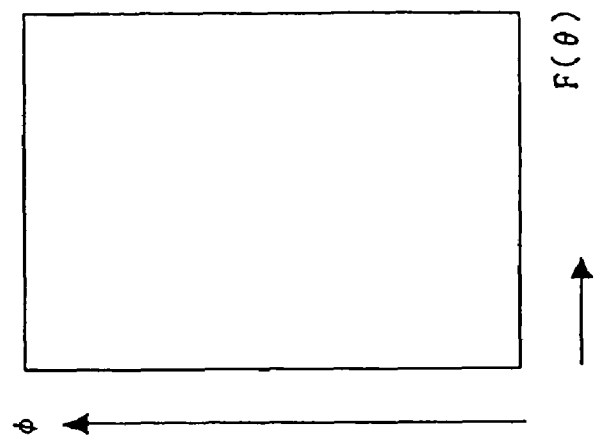

FIGS. 28A through 28C explains variations of the fifth embodiment. Instead of projection planes, road surface and cylinder shown in FIGS. 22A and 22B, a spherical surface with the position of the upper image pickup means 3001 as a center may be used as a projection plane. As shown in FIG. 28C, the horizontal axis of a converted image need not have an angle of θ but may be compressed using the function F(θ).

Figure 29A:
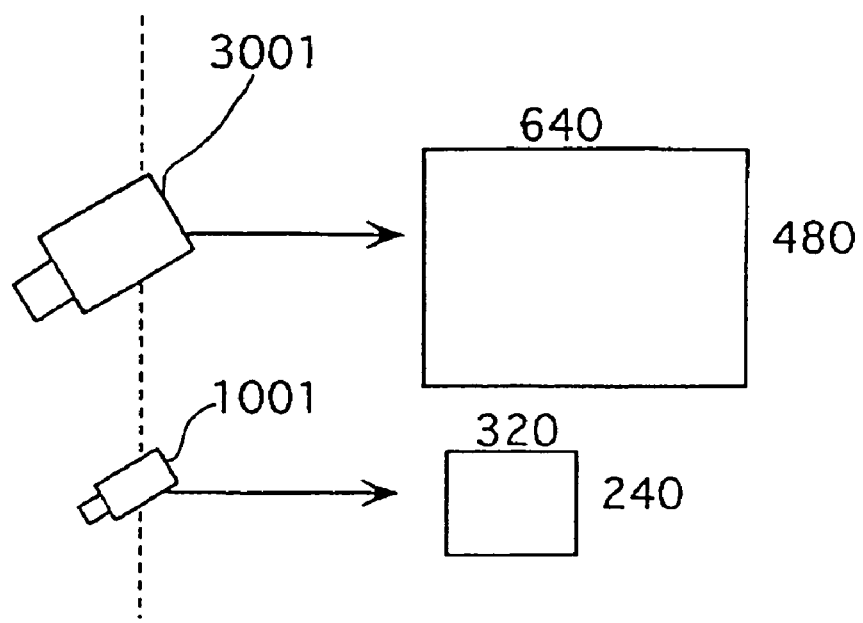
FIGS. 29A to 29C are schematic views showing the configuration of another variation of driving support apparatus according to the fifth embodiment of the invention.

FIG. 29A explains another variation of the fifth embodiment. The upper image pickup means 3001 has 640×480 pixels resolution. The lower image pickup means 1001 only used for stereo matching is 320×480 pixels resolution. With this configuration, a composite image to be displayed has a high resolution and it is possible to detect an obstacle border with practically sufficient accuracy, thus reducing the cost of image pickup means.

Figure 29B:
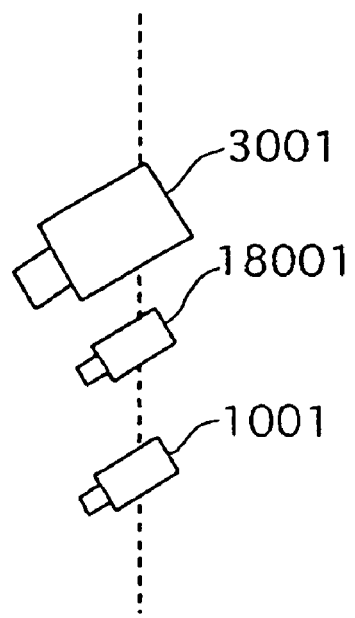

FIG. 29B explains another variation of the fifth embodiment. Image pickup means 18001 is added on the same axis as the image pickup means 3001, 1001 so as to verify an edge detected as an obstacle by using an image from the image pickup means 18001 thus reducing noises.

Figure 29C:
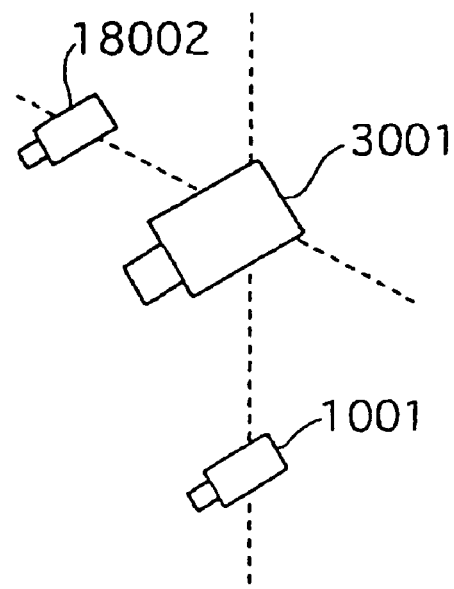

FIG. 29C explains another variation of the fifth embodiment. Image pickup means 18002 is added in a position separate from the axis of the image pickup means 3001, 1001 so as to detect an obstacle by using vertical edges as well as horizontal edges.

Figure 30A:
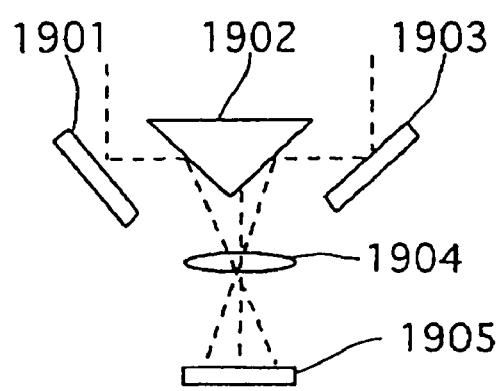
FIGS. 30A to 30C show variation of a stereo camera configuration method according to first through fifth embodiments of the invention.
Figure 30B:
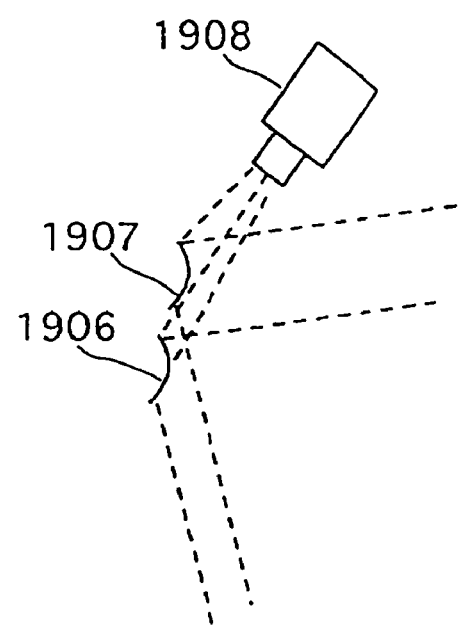
Figure 30C:
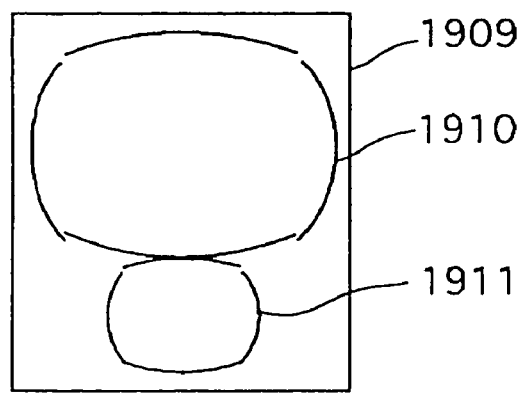
Figure 31A:
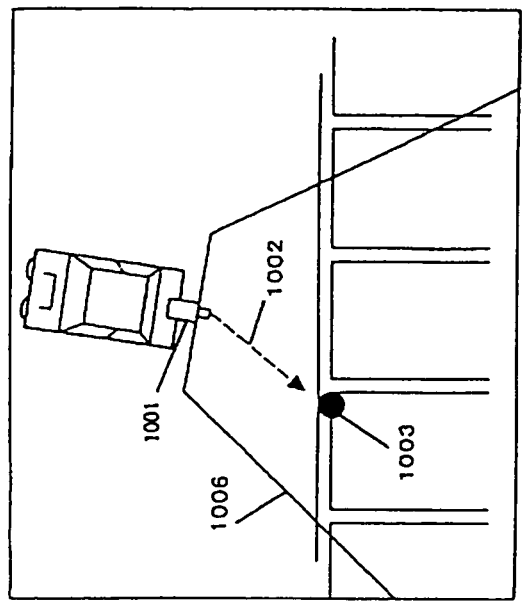
FIGS. 31A to 31D are schematic views showing the operation of related art driving support apparatus.
Figure 31B:
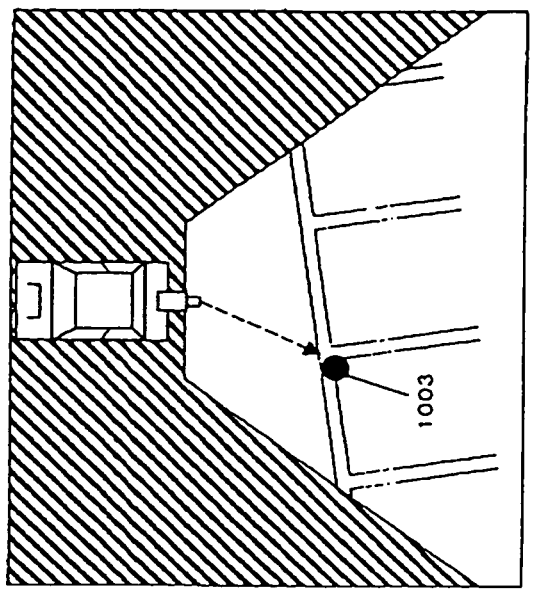
Figure 31C:
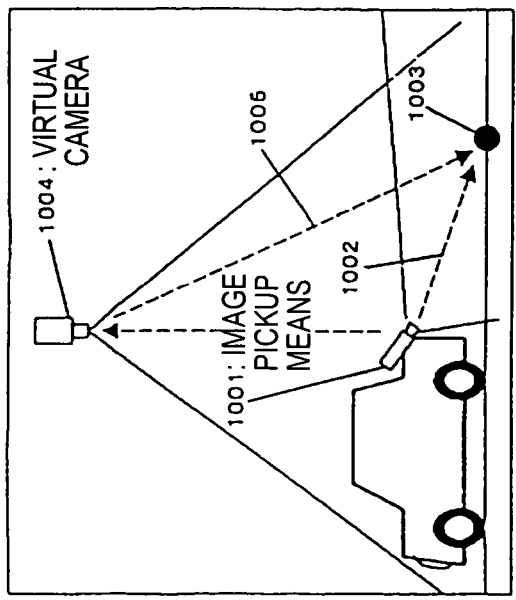
Figure 31D:
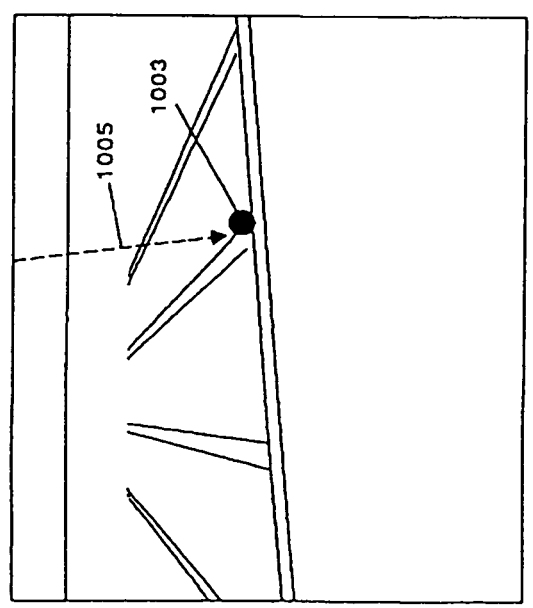
Figure 32A:
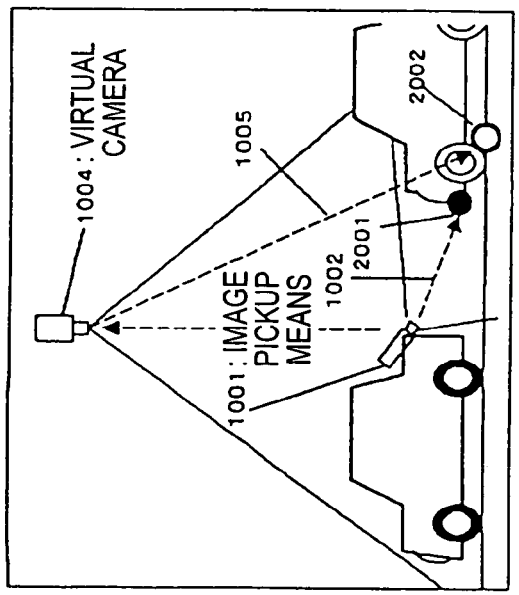
FIGS. 32A to 32D is a schematic view showing the problems of related art driving support apparatus.
Figure 32B:
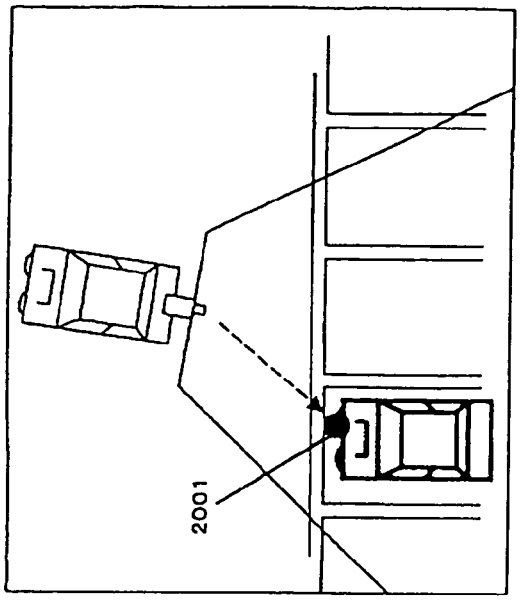
Figure 32C:
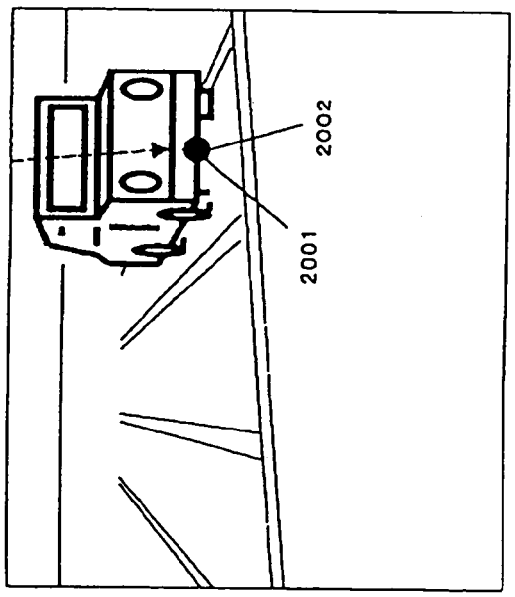
Figure 32D:
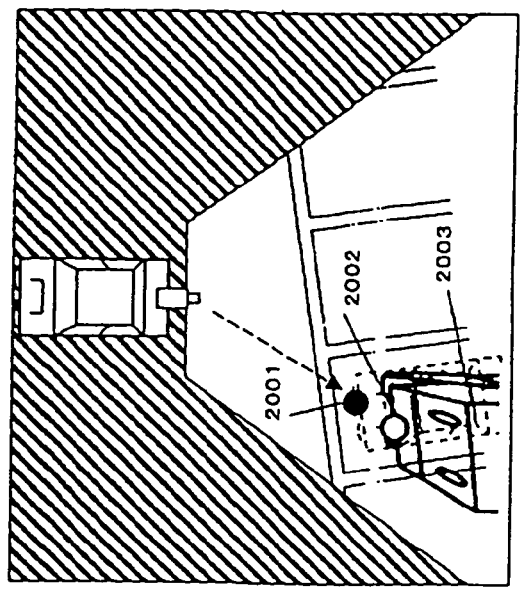

FIGS. 30A through 30C shows a single camera configuration instead of the upper and lower cameras for stereo image picking up in the first through fifth embodiments. FIG. 30A shows a configuration which obtains stereo images with respective parallax on the right and left on a single image pickup plane 1905 by arranging a plurality of mirrors 1901 through 1903 before a lens 1904. FIG. 30B shows a configuration which practically obtains images with parallax in the vertical direction by picking up two convex mirrors 1906, 1907 by a camera 1908. FIG. 30C shows an image picked up by the camera 1908 in FIG. 30B. On a screen 1909 are displayed an image 1910 picked up with the upper convex mirror 1907 and an image 1911 picked up with the lower convex mirror 1906.

Here, by adjusting the curvature of the convex mirrors 1906, 1907, it is possible to adjust the picking up range and the resolution of a pickup image (Adjustment may be made in vertical direction and horizontal direction independently of each other.).

While the range of an angle picked up with each of the convex mirrors 1906, 1907 is almost the same in FIG. 30B, the convex mirror 1906 has a larger curvature than the convex mirror 1907. The convex mirror 1906, with smaller size, images the same range as the convex mirror 1907. Thus, the image 1911 is smaller than the image 1910 on the screen 1909. As a result, the resulting resolution of the image 1910 is high while that of the image 1911 is relatively low. The image 1911 is used as an image compounded through viewpoint conversion while the image 1910 is used only for stereo analysis.

Via this composition, same as the other variation of the fifth embodiment shown in FIGS. 29A to 29C, a composite image to be displayed has a high resolution and it is possible to detect an obstacle border with practically sufficient accuracy, thus reducing the cost of a camera and an image processor.

As described using FIGS. 30A through 30C, a single camera may be used to pick up a stereo image with the aid of convex mirrors and reflective mirrors instead of upper and lower cameras in the first through fifth embodiments.

While driving support apparatus of the invention mainly generates images in the backward direction in the first through fifth embodiments, the invention is not limited to this arrangement but may generate images in the forward direction or lateral direction.

While an example which is based on image composition by way of a virtual viewpoint using a road surface model is explained in the first embodiment and an example which is based on image composition by way of orthogonal projection from above using a road surface model is explained in the second embodiment, a virtual viewpoint and orthogonal projection from above may be used interchangeably. In that case, the driving support apparatus of the invention is still advantageous.

Further, part or all of the features of each means of the driving support apparatus of the invention may be implemented using a program executed on a computer.

While the invention has been described in details and referring to specific embodiments, those skilled in the art will recognize that various changes and modifications can be made in it without departing the spirit and scope thereof.

This patent application is based on Japanese Patent Application (P2001-093721) filed Mar. 28, 2001 and Japanese Patent Application (P2001-244275) filed Aug. 10, 2001, the contents which are incorporated herein by reference.

INDUSTRIAL APPLICABILITY

As mentioned earlier, the invention provides driving support apparatus which has an excellent advantage that it can present the distance to and direction of an obstacle more intelligibly and accurately by converting an image picked up by image pickup means to an image seen from a virtual viewpoint above or to an image obtained through orthogonal projection from above, detecting three-dimensional information other than that on a road surface, correcting the distortion of the converted image based on the three-dimensional information, and displaying the corrected image.

The invention provides driving support apparatus which has an excellent advantage that it can present the distance to and direction of an obstacle more intelligibly and accurately by converting an image picked up by image pickup means to an image seen from a virtual viewpoint above or to an image obtained through orthogonal projection from above, detecting the area other than the road surface as an obstacle area by using the parallax between a plurality of pickup images and the parallax on a road surface model, compounding signals indicating the obstacle area to the converted image signals, and displaying the resulting image.

The invention provides driving support apparatus which has an excellent advantage that it can present the distance to and direction of an obstacle more intelligibly and accurately by converting an image picked up by image pickup means to an image seen from a virtual viewpoint above or to an image obtained through orthogonal projection from above, detecting an unmatched area between the converted images as an obstacle area, compounding signals indicating the obstacle area to the converted image signals, and displaying the resulting image.

The invention provides driving support apparatus which has an excellent advantage that it can present the distance to and direction of an obstacle more intelligibly and accurately by converting an image picked up by image pickup means to an intermediate image which uses a distance and an angle from the image pickup means as coordinates, estimating the actual distance to an unmatched area between the intermediate images and correcting the position of the area, detecting the corrected area as an obstacle area, compounding signals indicating the obstacle area in the intermediate image, converting the composite image to an ordinary image on coordinates, and displaying the resulting image.

The invention provides driving support apparatus which has an excellent advantage that it can present more reliable portions and less reliable portions by converting a pickup image to an image seen from a virtual viewpoint above or to an image obtained through orthogonal projection from above, and intelligibly presenting the distance to and an area of an obstacle with large distortion.

Further, the invention provides driving support apparatus which has an excellent advantage that it can present the distance to and direction of an obstacle more intelligibly and accurately by converting an image picked up by image pickup means to an intermediate image which uses a distance or a height and an angle from the image pickup means as coordinates, estimating the actual distance to an unmatched area between the intermediate images and correcting the position of the area, detecting the corrected area as an obstacle area, compounding signals indicating the obstacle area in the intermediate image, converting the composite image to an ordinary image on coordinates, and displaying the resulting image.

The invention provides driving support apparatus which has an excellent advantage that it can present the distance to and direction of an obstacle more intelligibly and accurately by converting an image picked up by image pickup means to an intermediate image which uses a plane symmetrical about a straight line connecting the image pickup means as a projection plane, estimating the actual distance to an unmatched area between the intermediate images and correcting the position of the area, detecting the corrected area as an obstacle area, compounding signals indicating the obstacle area in the intermediate image, converting the composite image to an ordinary image on coordinates, and displaying the resulting image.

The invention provides driving support apparatus which has an excellent advantage that it can present the distance to and direction of an obstacle more intelligibly and accurately by converting a plurality of images having a predetermined parallax between them, correcting an viewpoint-converted image based on the parallax between the plurality of pickup images, and displaying the resulting image.

As mentioned hereabove, the invention provides driving support apparatus which has an excellent advantage that it can reduce a burden on the driver and prompts accurate and safe driving.

The invention claimed is:

1. Driving support apparatus comprising:
   image pickup means mounted on a mobile unit;
   conversion means for converting one or more images picked up by said image pickup means to an image seen from a virtual viewpoint above said image pickup means or an image orthogonal-projected from above based on a road surface model;
   detection means for detecting three-dimensional information other than that on the road surface based on a parallax between images picked up by said image pickup means;
   distortion correction means for correcting distortion of a figure in an image, for which said viewpoint conversion is performed, based on said detected three-dimensional information; and
   display means for displaying an image for which said distortion-corrected is performed.

2. Driving support apparatus comprising:
   image pickup means mounted on a mobile unit;
   conversion means for converting one or more images picked up by said image pickup means to an image seen from a virtual viewpoint above a position of said image pickup means or an image orthogonal-projected from above based on a road surface model; and
   obstacle area detection means for detecting an area where a parallax between images picked up by said image pickup means does not coincide with a parallax on the road surface model as an obstacle area.

3. Driving support apparatus according to claim 2, comprising:

overlay means for overlaying said detected area in an image, for which said viewpoint-converted is performed, based on said road surface model; and display means for displaying said composite image.

4. Driving support apparatus according to claim 3, wherein said overlay means detects a distance from said image pickup means and a height from a road surface based on a parallax of said detected area, changes a display of areas according to the distance and the height, and then overlays said detected area in an image, for which said viewpoint-converted is performed, based on said road surface model.

5. Driving support apparatus according to claim 3, wherein said overlay means detects a distance from said image pickup means based on a parallax of said detected area, and overlays said detected area and character which shows said detected distance in an image, for which said viewpoint-converted is performed, based on said road surface model.

6. Driving support apparatus comprising:

image pickup means mounted on a mobile unit;

conversion means for converting one or more images picked up by said image pickup means to an image seen from a virtual viewpoint above a position of said image pickup means or an image orthogonal-projected from above based on a road surface model;

obstacle area detection means for detecting an unmatched area between said converted images as an obstacle area;

overlay means for overlaying said obstacle area in said converted image; and display means for displaying said composite image.

7. Driving support apparatus comprising:

image pickup means mounted on a mobile unit;

intermediate image conversion means for converting one or more images picked up by said image pickup means to an intermediate image in which a distance and an angle from said image pickup means are coordinates based on a road surface model;

obstacle area detection means for detecting an unmatched area between said converted images, compares two images in said area to estimate an actual distance, corrects a distance and a position of said area in said converted image with the estimated distance, and outputs the corrected area as an obstacle area;

overlay means for overlaying said obstacle area in said converted image;

conversion means for converting said composite image to an ordinary coordinate image of a road surface; and display means for displaying said converted image.

8. Driving support apparatus according to one of claims 1 through 7, wherein a plurality of the image pickup means mounted on said mobile unit are arranged at predetermined intervals in a vertical direction of said mobile unit, in a vertical direction to a road surface model, or in a direction from one of the image pickup means to said virtual viewpoint or a line of sight orthogonal projected.

9. Driving support apparatus comprising:

image pickup means mounted on a mobile unit;

conversion means for respectively converting one or more images picked up by said image pickup means to an image seen from a virtual viewpoint above a position of said image pickup means or an image orthogonal-projected from above based on a road surface model; and display means for displaying said converted image, wherein said conversion means determines a strength based on a size of each pixel on the road surface model on the screen of said image pickup-means and an angle to the road surface, and varies a brightness and a color of pixels based on the strength.

10. Driving support apparatus comprising:

image pickup means mounted on a mobile unit;

intermediate image conversion means for converting one or more images picked up by said image pickup means to an intermediate image in which a distance or a height and an angle from said image pickup means are coordinates based on a road surface model and a cylinder model;

obstacle area detection means for detecting an unmatched area between said converted images, compares two images in said area to estimate an actual distance, corrects a distance and a position of said area in said converted image with the estimated distance, and outputs the corrected area as an obstacle area;

overlay means for overlaying said obstacle area in said converted image, conversion means for converting said composite image to an ordinary coordinate image of a road surface; and display means for displaying said converted image.

11. Driving support apparatus comprising:

image pickup means mounted on a mobile unit;

intermediate image conversion means for converting an image picked up by said image pickup means to an intermediate image in which a plane symmetrical with respect to a straight line linking between said image pickup means as a axis is a projection plane;

obstacle area detection means for detecting an unmatched area between said converted images, compares two images in said area to estimate an actual distance, corrects a distance and a position of said area in said converted image with the estimated distance, and outputs the corrected area as an obstacle area;

overlay means for overlaying said obstacle area in said converted image, conversion means for converting said composite image to an ordinary coordinate image of a road surface; and display means for displaying said converted image.

12. Driving support apparatus according to claim 7, 10 or 11, comprising:

storage means for storing search range data.

13. Driving support apparatus according to claim 7, 10 or 11, wherein at least three units of said image pickup means are arranged on the same axis.

14. Driving support apparatus according to claim 7, 10 or 11, wherein three or more units of said image pickup means in total including two units of said image pickup means on a vertical axis and two units of image pickup means on a horizontal axis, around the single imaging pickup means, are arranged.

15. Driving support apparatus according to claim 7, 10 or 11, wherein said image pickup means includes two or more image pickup means having different resolutions.

16. Driving support apparatus comprising:

image pickup means mounted on a mobile unit;

conversion means for converting an image picked up by said image pickup means to a viewpoint-converted image seen from a virtual viewpoint which is different from a position of said image pickup means; and display means for displaying an image converted by said conversion means, wherein said image pickup means picks up a plurality of images having a predetermined parallax and said display means displays an image which is corrected based on said parallax.

17. Distance information extraction apparatus comprising:

image pickup means for picking up a plurality of images from a plurality of observation points;

conversion means for converting said plurality of images to intermediate images projected onto a plane having orthogonal coordinates;

means for defining one of said orthogonal coordinates as a direction of rotation angle about an axis passing through said plurality of observation points and aligning a search direction to obtain a parallax between said intermediate images in a direction of another coordinate of said orthogonal coordinates; and measurement means for measuring a distance to a target in said image based on said parallax.

* * * * *